United States Patent
Kim et al.

(10) Patent No.: US 10,687,007 B2
(45) Date of Patent: Jun. 16, 2020

(54) SYSTEM AND METHOD FOR CONTROLLING POWER SUPPLIED TO A MODULE OF AN ELECTRONIC DEVICE

(71) Applicant: Samsung Electronics Co., Ltd., Suwon-si, Gyeonggi-do (KR)

(72) Inventors: Dongsoo Kim, Suwon-si (KR); Hwayong Kang, Suwon-si (KR); Youngkwon Yoon, Seoul (KR); Donghoon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/773,534

(22) PCT Filed: Oct. 24, 2016

(86) PCT No.: PCT/KR2016/011961
§ 371 (c)(1),
(2) Date: May 3, 2018

(87) PCT Pub. No.: WO2017/078312
PCT Pub. Date: May 11, 2017

(65) Prior Publication Data
US 2018/0324373 A1    Nov. 8, 2018

(30) Foreign Application Priority Data

Nov. 4, 2015 (KR) .......................... 10-2015-0154619

(51) Int. Cl.
*H04N 5/369* (2011.01)
*H04N 5/378* (2011.01)
(Continued)

(52) U.S. Cl.
CPC ............. *H04N 5/3698* (2013.01); *G03B 7/26* (2013.01); *H04N 5/232* (2013.01); *H04N 5/30* (2013.01);
(Continued)

(58) Field of Classification Search
CPC ...... H04N 5/369; H04N 5/3698; H04N 5/374; H04N 5/3745; H04N 5/37455; H04N 5/378; G03B 7/26
See application file for complete search history.

(56) References Cited

U.S. PATENT DOCUMENTS 7,408,138 B2    8/2008  Lee
9,549,135 B2 *  1/2017  Kito ....................... H04N 5/378
(Continued)

FOREIGN PATENT DOCUMENTS

CN    104914914 A    9/2015
EP    1944961 A1    7/2008
(Continued)

OTHER PUBLICATIONS

ISA/KR, "International Search Report and Written Opinion of the International Searching Authority," International Application No. PCT/KR2016/011961, dated Jan. 24, 2017, 12 pages.
(Continued)

*Primary Examiner* — Ngoc Yen T Vu

(57) ABSTRACT

The electronic device according to various examples comprises a power supply module and an image sensor, wherein the image sensor comprises: a pixel array including a plurality of pixels; an analog-digital converter, of a first group, for converting the amount of light acquired through the pixel array into a first digital signal; and an analog-digital converter of a second group, the analog-digital converter
(Continued)

being adjacent to the first group and for converting power, supplied from the power supply module to the image sensor, into a second digital signal.

18 Claims, 19 Drawing Sheets

(51) Int. Cl.
*G03B 7/26* (2006.01)
*H04N 5/335* (2011.01)
*H04N 5/30* (2006.01)
*H04N 5/232* (2006.01)
*H04N 5/357* (2011.01)

(52) U.S. Cl.
CPC ............ *H04N 5/335* (2013.01); *H04N 5/357* (2013.01); *H04N 5/378* (2013.01)

(56) References Cited

U.S. PATENT DOCUMENTS

| | | | |
|---|---|---|---|
| 9,843,747 | B2 * | 12/2017 | Wakabayashi ......... H04N 5/374 |
| 2007/0029467 | A1 | 2/2007 | Lee |
| 2008/0170145 | A1 | 7/2008 | Richardson |
| 2013/0107091 | A1 | 5/2013 | Teshima et al. |
| 2013/0162857 | A1 | 6/2013 | Kwon et al. |
| 2014/0218599 | A1 * | 8/2014 | Nakamura ......... H04N 5/23241 348/372 |
| 2015/0070571 | A1 | 3/2015 | Kim et al. |
| 2015/0162925 | A1 | 6/2015 | Lee et al. |

FOREIGN PATENT DOCUMENTS

| | | |
|---|---|---|
| JP | 2008109266 A | 5/2008 |
| KR | 10-2007-0016461 A | 2/2007 |
| KR | 10-2011-0113917 A | 10/2011 |
| KR | 10-1268977 B1 | 5/2013 |
| KR | 10-2013-0074286 A | 7/2013 |
| KR | 10-2015-0066856 A | 6/2015 |

OTHER PUBLICATIONS

Supplementary European Search Report dated Sep. 24, 2018 in connection with European Patent Application No. 16 86 2328, 9 pages.
First Office Action in connection with Chinese Application No. 201680064705.7 dated Mar. 13, 2020, 20 pages.

* cited by examiner

SYSTEM AND METHOD FOR CONTROLLING POWER SUPPLIED TO A MODULE OF AN ELECTRONIC DEVICE

CROSS-REFERENCE TO RELATED APPLICATION AND CLAIM OF PRIORITY

This application is a 371 National Stage of International Application No. PCT/KR2016/011961 filed Oct. 24, 2016, which claims priority to Korean Patent Application No. 10-2015-0154619 filed Nov. 4, 2015, the disclosures of which are herein incorporated by reference in their entirety.

BACKGROUND

1. Field

The present disclosure relates to an image sensor and an electronic device which can detect and control power supplied to an operating module of the electronic device, and an operating method thereof.

2. Description of Related Art

In an electronic device, each operating module can perform a predetermined function by an applied operating power. The operating module receives the operating power through an external wiring connected to a power supply module and an internal wiring connected to a device inside the operating module.

SUMMARY

The operating module of the electronic device is constituted by mounting at least one device on a printed circuit board (PCB), and the device may be a printed circuit board assembly (PCBA) that performs a predetermined function by the operating power supplied from the outside. For example, the operating module may be an image sensor. At this time, a voltage drop may occur due to the external wiring and the internal wiring which are power supply paths in the operating power. Further, noise may be introduced into the power supplied to the operating module through the wiring. At this time, when the voltage is dropped or the power into which noise is introduced is supplied, the operating module may malfunction or cause unwanted noise. However, the operating module cannot measure the level or quality of the supplied power. In order to monitor the power supplied to the operating module of the electronic device, the power from the outside should be verified using a measuring device.

Therefore, the present disclosure has been made in view of the above-mentioned problems, and an aspect of the present disclosure is to provide a device and method which may monitor power supplied to an operating module and may control the power supplied to the operating module according to a result of the monitoring.

Another aspect of the present disclosure is to provide a device and method which may include a power control module for detecting power supplied to devices inside an operating module and may monitor the power from the outside of the operating module to control the power supplied to the operating module.

In accordance with an aspect of the present disclosure, there is provided an image sensor including: a pixel array configured to include a plurality of pixels; an analog-to-digital converter (ADC) of a first group configured to convert an amount of light acquired through the pixel array into a first digital signal; and an ADC of a second group configured to be adjacent to the first group and to convert power supplied to the image sensor into a second digital signal.

In accordance with another aspect of the present disclosure, there is provided an electronic device including: a power supply module; and an image sensor, wherein the image sensor includes a pixel array configured to include a plurality of pixels, an ADC of a first group configured to convert an amount of light acquired through the pixel array into a first digital signal, and an ADC of a second group configured to be adjacent to the first group and to convert power from the power supply module to the image sensor into a second digital signal.

In accordance with still another aspect of the present disclosure, there is provided an electronic device including: an image sensor; a power supply module configured to supply power to the image sensor; and a power control module configured to be provided inside the image sensor, wherein the power control module is configured to measure the power and to transmit feedback to the power supply module when the power is out of a designated range.

In accordance with yet another aspect of the present disclosure, there is provided a method of operating an image sensor which includes a pixel array, an ADC of a first group, and an ADC of a second group which is adjacent to the first group, including: receiving power from the outside of the image sensor; converting an amount of light acquired through the pixel array into a first digital signal, using the first group; and converting the power into a second digital signal, using the second group.

An image sensor according to various embodiments can identify the level and quality of operating power supplied to the image sensor. In addition, an electronic device according to various embodiments can identify the level and quality of the operating power supplied to an operating module. An electronic device according to various embodiments can stably drive an operating module. In addition, an electronic device according to various embodiments can measure operating power through the addition of a simple component (e.g., an analog-to-digital converter) when a PCB or a circuit is designated, and may miniaturize and integrate an operating module such as an image sensor.

DETAILED DESCRIPTION

Figure 1:
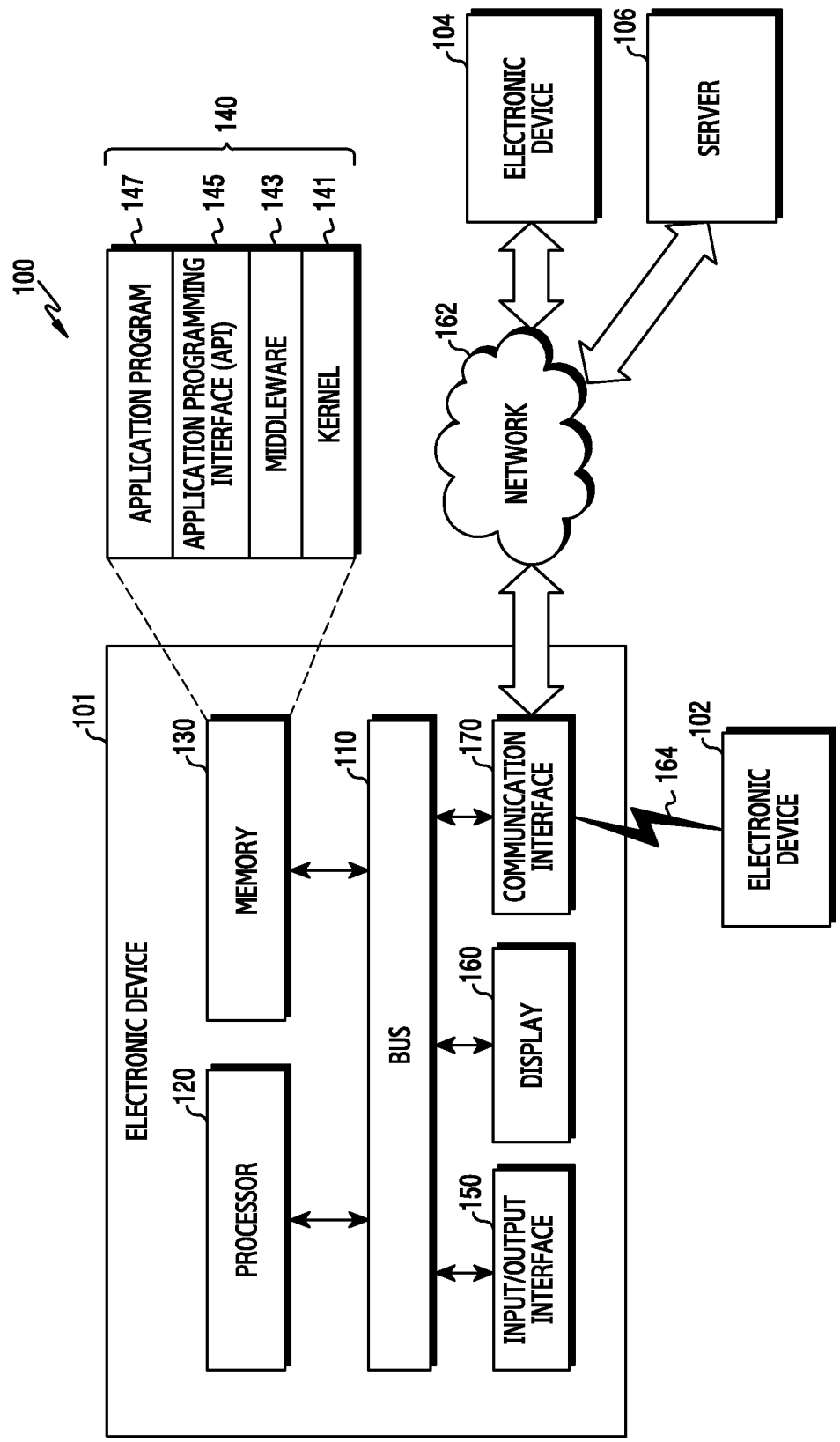
FIG. 1 illustrates a network environment system according to various embodiments.

Various embodiments of the present disclosure are described in greater detail with reference to the accompanying drawings. The same or similar components may be designated by the same or similar reference numerals although they are illustrated in different drawings. Detailed descriptions of implementations or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto. According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

FIG. 1 illustrates a network environment system (100) according to various embodiments. The electronic device 101 includes a bus 110, a processor 120, a memory 130, an input/output interface 150, a display 160, and a communication interface 170. The electronic device 101 may be provided without at least one of the components, or may include at least one additional component. The bus 110 may include a circuit for connecting the components 120 through 170 and delivering communication signals (e.g., control messages or data) therebetween. The processor 120 may include various processing circuitry, such as, for example, and without limitation one or more of a dedicated processor, a CPU, an AP, and a communication processor (CP). The processor 120, for example, may perform an operation or data processing with respect to control and/or communication of at least another component of the electronic device 101.

The memory 130 may include a volatile and/or nonvolatile memory. The memory 130, for example, may store one or more instructions or data relating to at least another component of the electronic device 101. According to an embodiment of the present disclosure, the memory 130 may store software and/or a program 140. The program 140 includes, for example, a kernel 141, middleware 143, an application programming interface (API) 145, and/or an application program (or applications) 147. At least part of the kernel 141, the middleware 143, or the API 145 may be referred to as an operating system (OS). The kernel 141 may control or manage system resources (e.g., the bus 110, the processor 120, or the memory 130) used for performing operations or functions implemented by the other programs (e.g., the middleware 143, the API 145, or the applications 147). Additionally, the kernel 141 may provide an interface for controlling or managing system resources by accessing an individual component of the electronic device 101 from the middleware 143, the API 145, or the applications 147.

The middleware 143, for example, may serve an intermediary role for exchanging data between the API 145 or the applications 147 and the kernel 141 through communication. Additionally, the middleware 143 may process one or more job requests received from the applications 147, based on their priority. The middleware 143 may assign a priority for using a system resource (e.g., the bus 110, the processor 120, or the memory 130) of the electronic device 101 to at least one of the applications 147, and process the one or more job requests. The API 145, as an interface through which the applications 147 controls a function provided from the kernel 141 or the middleware 143, may include, for example, at least one interface or function (e.g., an instruction) for file control, window control, image processing, or character control. The input/output interface 150, for example, may deliver one or more instructions or data input from a user or another external device to other component(s) of the electronic device 101, or output one or more instructions or data input from the other component(s) of the electronic device 101 to the user or another external device.

The display 160, for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 160, for example, may display various content (e.g., texts, images, videos, icons, and/or symbols) to the user. The display 160 may include a touch screen, for example, and receive touch, gesture, proximity, or hovering inputs by using an electronic pen or a user's body part. The communication interface 170 may include various communication circuitry and, for example, may set communications between the electronic device 101 and an external device (e.g., a first external electronic device 102, a second external electronic device 104, or a server 106. The communication interface 170 may communicate with the second external electronic device 104 or the server 106 over a network 162 through wireless communication or wired communication. The communication interface 170 may additionally communicate with the first external electronic device 102 using a short-range wireless communication connection 164.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, at least one of wireless fidelity (Wi-Fi), light fidelity (Li-Fi), Bluetooth™, Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 162 may include a telecommunications network, for example, at least one of a computer network (e.g., LAN or WAN), the Internet, and a telephone network.

Each of the first and second external electronic devices 102 and 104 may be of the same type or of a different type from that of the electronic device 101. According to an embodiment of the present disclosure, all or part of operations executed in the electronic device 101 may be executed by another electronic device or a plurality of electronic devices (e.g., the electronic device 102 or 104, or the server 106). To perform a function or service automatically or by request, instead of performing the function or the service by the electronic device 101, the electronic device 101 may request at least part of a function relating thereto from the electronic device 102 or 104, or the server 106. The electronic device 102 or 104, or the server 106 may perform the requested function or an additional function and send its result to the electronic device 101. The electronic device 101 may provide the requested function or service by processing the received result. In doing so, for example, cloud computing, distributed computing, or client-server computing techniques may be used.

Figure 2:
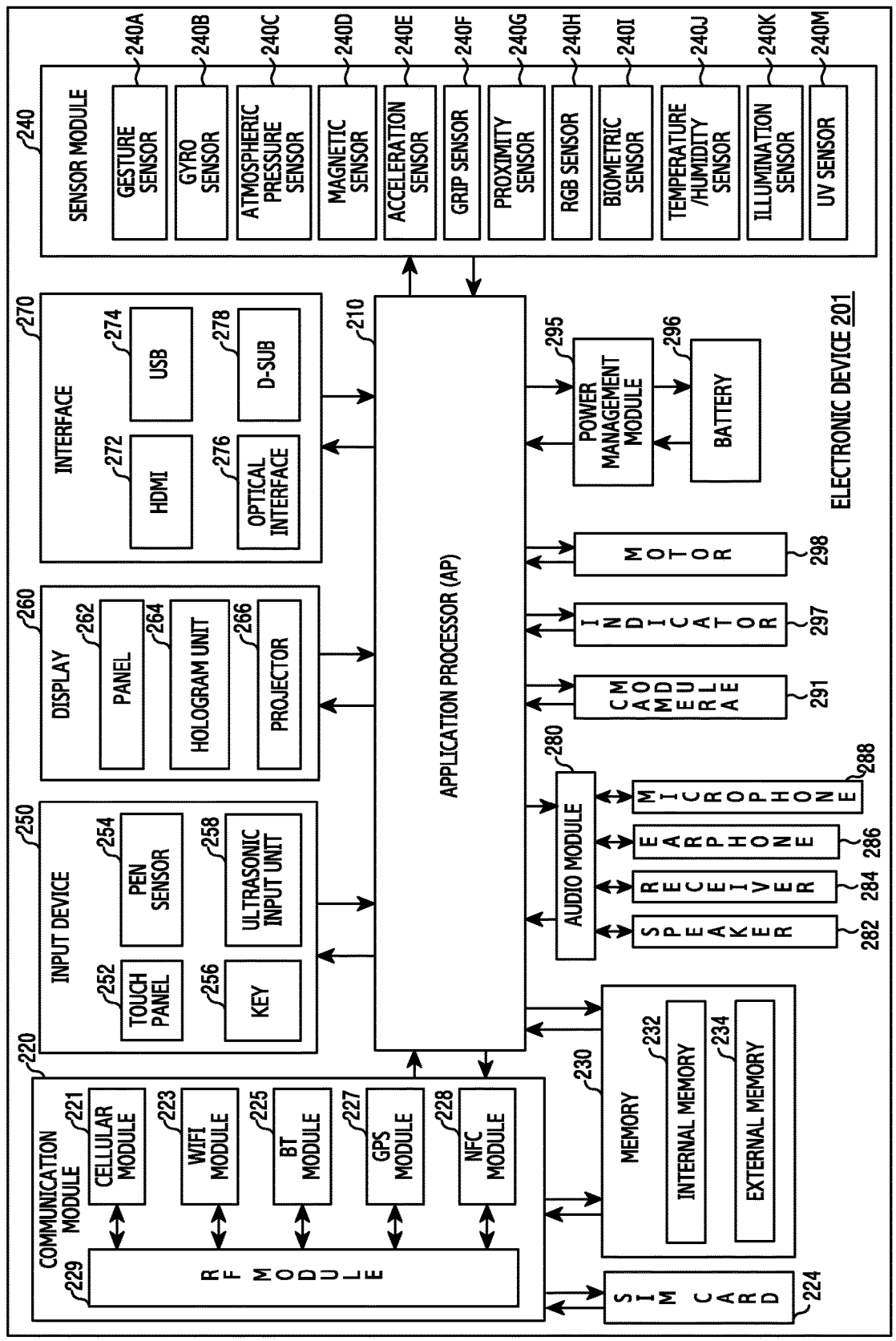
FIG. 2 is a block diagram illustrating an electronic device according to various embodiments.

FIG. 2 is a block diagram illustrating an electronic device 201 according to various embodiments. The electronic device 201, for example, may include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, may include various processing circuitry and may control a plurality of hardware or software components connected to the processor 210, and also may perform various data processing and operations by executing an OS or an application program. The processor 210 may be implemented with a system on chip (SoC), for example. The processor 210 may further include a graphic processing unit (GPU) and/or an image signal processor. The processor 210 may include at least part (e.g., a cellular module 221) of the components illustrated in FIG. 2. The processor 210 may load one or more instructions or data received from at least one other component (e.g., a nonvolatile memory) into a volatile memory, process the one or more instructions, and store various data in the nonvolatile memory.

The communication module 220 may have the same or similar configuration as the communication interface 170 of FIG. 1. The communication module 220 may include various communication circuitry, such as, the cellular module 221, a Wi-Fi module 223, a Bluetooth™ (BT) module 225, a GNSS module 227, an NFC module 228, and an RF module 229. The cellular module 221, for example, may provide voice call, video call, short message service (SMS), or Internet service through a communication network. The cellular module 221 may identify and authenticate the electronic device 201 in a communication network by using the SIM 224. The cellular module 221 may perform at least part of a function that the processor 210 provides. The cellular module 221 may further include a CP. At least some (e.g., two or more) of the cellular module 221, the Wi-Fi module 223, the BT module 225, the GNSS module 227, and the NFC module 228 may be included in one integrated circuit (IC) or an IC package. The RF module 229, for example, may transmit/receive a communication signal (e.g., an RF signal). The RF module 229, for example, may include a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through an additional RF module. The SIM 224, for example, may include a card or an embedded SIM, and also may contain unique identification information (e.g., an integrated circuit card identifier (ICCID)) or subscriber information (e.g., an international mobile subscriber identity (IMSI)).

The memory 230 (e.g., the memory 130) may include at least one of an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

The sensor module 240 may, for example, measure physical quantities or detect an operating state of the electronic device 201, and convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor). The sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. The electronic device, as part of the processor 210 or individually, may further include a processor configured to control the sensor module 240 and control the sensor module 240 while the processor 210 is sleeping.

The input device 250 may include various input circuitry including at least one of a touch panel 252, a (digital) pen sensor 254, a key 256, and an ultrasonic input device 258. The touch panel 252 may use at least one of, for example, capacitive, resistive, infrared, and ultrasonic methods. Additionally, the touch panel 252 may further include a control circuit. The touch panel 252 may further include a tactile layer to provide a tactile response to a user. The (digital) pen sensor 254 may include, for example, part of a touch panel or a sheet for recognition. The key 256 may include, for example, a physical button, a touch key, an optical key, or a keypad. The ultrasonic input device 258 may detect ultrasonic waves from a microphone 288 and check data corresponding to the detected ultrasonic waves.

The display 260 (e.g., the display 160) may include at least one of a panel 262, a hologram device 264, a projector 266, and/or a control circuit for controlling them. The panel 262 may be flexible, transparent, or wearable, for example. The panel 262 and the touch panel 252 may be configured with one or more modules. The panel 262 may include a pressure sensor (or a force sensor) for measuring a pressure of the user touch. The pressure sensor may be integrated with the touch panel 252, or include one or more sensors separately from the touch panel 252. The hologram device 264 may show three-dimensional images in the air by using the interference of light. The projector 266 may display an image by projecting light on a screen. The screen, for example, may be placed inside or outside the electronic device 201. The interface 270 includes various interface circuitry, such as an HDMI 272, a USB 274, an optical interface 276, or a D-subminiature (D-sub) 278. The interface 270 may be included in, for example, the communication interface 170 of FIG. 1. Additionally or alternately, the interface 270 may include a mobile high-definition link (MEL) interface, a SD card/MMC interface, or an infrared data association (IrDA) standard interface.

The audio module 280, for example, may convert sounds into electrical signals and convert electrical signals into sounds. At least some components of the audio module 280 may be included in, for example the input/output interface 150 of FIG. 1. The audio module 280 may process sound information input or output through a speaker 282, a receiver 284, an earphone 286, or the microphone 288. The camera module 291, as a device for capturing still images and videos, may include one or more image sensors (e.g., a front sensor or a rear sensor), a lens, an image signal processor (ISP), or a flash (e.g., an LED or a xenon lamp). The power management module 295, for example, may manage the power of the electronic device 201. According to an embodiment of the present disclosure, the power management module 295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 296, or a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into a mechanical vibration and generate a vibration or haptic effect. The electronic device 201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 201 may be configured to include at least one of the above-described components or an additional component, or to not include some of the above-described components. Additionally, some of components in an electronic device are configured as one entity, so that functions of previous corresponding components are performed identically.

Figure 3:
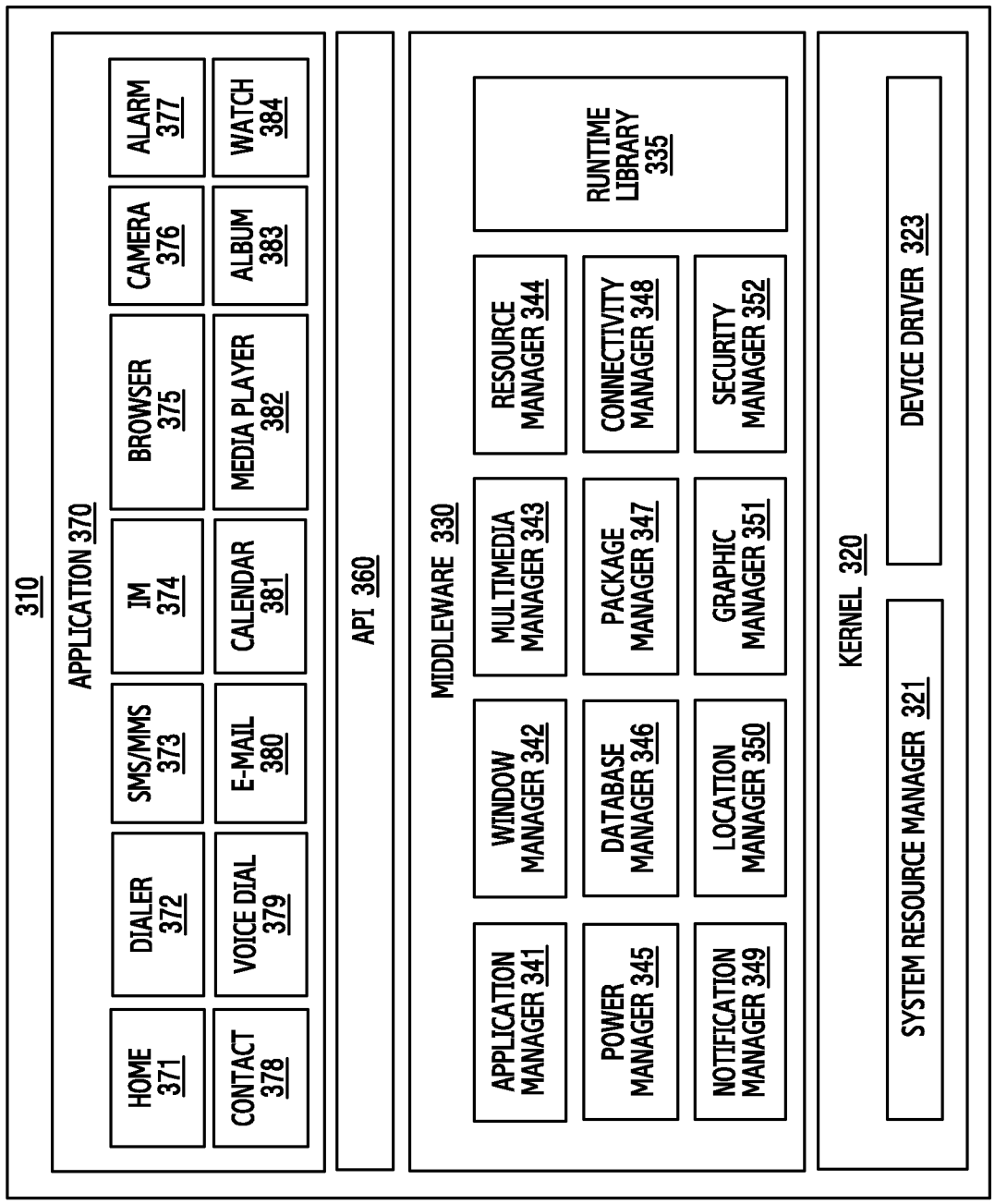
FIG. 3 is a block diagram illustrating a programming module according to various embodiments.

FIG. 3 is a block diagram illustrating a programming module according to various embodiments. A program module 310 (e.g., the program 140) may include an OS for controlling a resource relating to the electronic device 101 and/or the applications 147 running on the OS. The OS may include, for example, Android™, iOS™, Windows™, Symbian™, Tizen™, or Bada™. Referring to FIG. 3, the program module 310 includes a kernel 320 (e.g., the kernel 141), a middleware 330 (e.g., the middleware 143), an API 360 (e.g., the API 145), and/or an application 370 (e.g., the applications 147). At least part of the program module 310 may be preloaded on an electronic device or may be downloaded from an external electronic device (e.g., the first external electronic device 102, the second external electronic device 104, or the server 106).

The kernel 320 includes, for example, at least one of a system resource manager 321 and/or a device driver 323. The system resource manager 321 may control, allocate, or retrieve a system resource. According to an embodiment of the present disclosure, the system resource manager 321 may include a process management unit, a memory management unit, or a file system management unit. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver. The middleware 330, for example, may provide a function commonly utilized by the application 370, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may manage input/output, manage memory, or arithmetic function processing. The application manager 341, for example, may manage the life cycle of the applications 370. The window manager 342 may manage a GUI resource used in a screen. The multimedia manager 343 may recognize a format for playing various media files and encode or decode a media file by using the codec in a corresponding format. The resource manager 344 may manage a source code of the application 3740 or a memory space. The power manager 345 may manage the capacity, temperature, and/or power of the battery, and determine or provide power information for an operation of the electronic device using corresponding information among the capacity, temperature, and/or power of the battery. The power manager 345 may operate together with a basic input/output system (BIOS). The database manager 346 may create, search, edit or otherwise use a database used in the application 370. The package manager 347 may manage installation or updating of an application distributed in a package file format.

The connectivity manager 348 may manage, for example, a wireless connection. The notification manager 349 may provide an event, such as incoming messages, appointments, and proximity alerts, to the user. The location manager 350 may manage location information of an electronic device. The graphic manager 351 may manage a graphic effect to be provided to the user or a user interface relating thereto. The security manager 352 may provide, for example, system security or user authentication. The middleware 330 may include a telephony manager for managing a voice or video call function of the electronic device, or a middleware module for combining various functions of the above-described components. The middleware 330 may provide a module specialized for each type of OS. The middleware 330 may dynamically delete part of the existing components or add new components. The API 360, as a set of API programming functions, may be provided as another configuration according to the OS. For example, Android or iOS may provide one API set for each platform, and Tizen may provide two or more API sets for each platform.

The application 370 includes at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock 384. Additionally, the application 370 may include health care (e.g., measure an exercise amount or blood sugar level), or environmental information (e.g., air pressure, humidity, or temperature information) application. The application 370 may include an information exchange application for supporting information exchange between the electronic device and an external electronic device. The information exchange application may include, for example, a notification relay application for relaying specific information to the external device or a device management application for managing the external electronic device. The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 370 may include a specific application (e.g., a health care application of a mobile medical device) according to a property of the external electronic device. The application 370 may include an application received from an external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

Figure 4A:
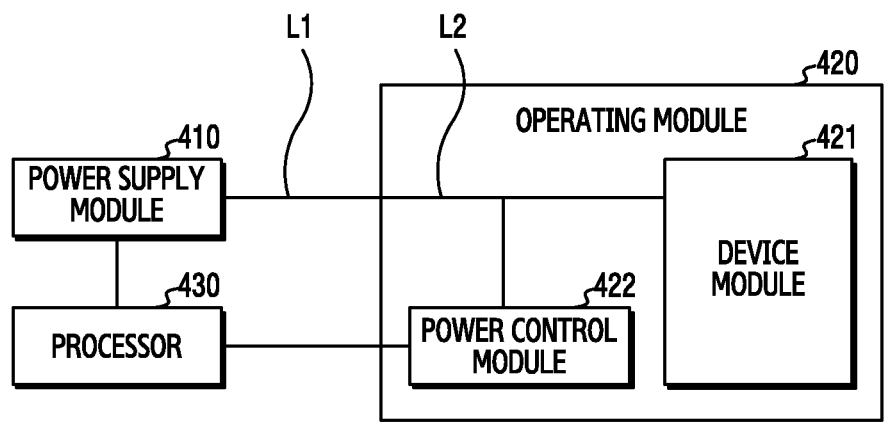
FIGS. 4A to 4C are block diagrams illustrating an electronic device according to various embodiments.

FIG. 4A is a block diagram illustrating an electronic device according to various embodiments.

Referring to FIG. 4A, an electronic device according to various embodiments may include, for example, a power supply module 410, an operating module 420, and a processor 430. The electronic device according to various embodiments may include at least one operating module 420.

The power supply module 410 may generate power to be supplied to the operating module 420. The power supply module 410 may supply at least one power source to perform the operation of the operating module 420. The power supply module 410 may correspond to a power management module 295 which will be described in FIG. 2.

According to one embodiment, the power supply module 410 may be a power management IC (PMIC) and/or a low dropout regulator (LDO). The PMIC may be used to increase battery driving time in an electronic device that should be operated using a battery. For example, when an interface signal according to a load that should be processed in a processor 430 (e.g., CPU or the like) is transmitted to the PMIC, a supplied core voltage is adjusted according to the transmitted interface signal so that the PMIC may be driven with minimum power. The LDO may be used when a difference between an input voltage and an output voltage is not large, and may be driven with a normal output value very quickly because the initial output is significantly strong.

The operating module 420 may include, for example, a device module 421 and a power control module 422.

The device module 421 may process data input by the power supplied from the power supply module 410 or perform a predetermined function to output the data. For example, the device module 421 may be an image sensor module, a display module, or the like. The power control module 422 may receive power from the power supply module 410. The power received by the power control module 422 may be a power supplied to the device module 421.

The power control module 422 may detect and store the power supplied to the operating module 420. The operating module 420 may receive power via, for example, an external wiring L1 and an internal wiring L2. The external wiring L1 is a wiring for supplying power from the power supply module 410 to the operating module 420. The internal wiring L2 is a wiring for supplying power to the device module 421 in the operating module 420.

According to one embodiment, the power supplied to the operating module 420 may cause a voltage drop by the external wiring L1 and the internal wiring L2. For example, the power may cause a primary voltage drop by the external wiring L1. The power may cause a secondary voltage drop by the internal wiring L2. In addition, noise may be introduced into the power or noise may occur by coupling with peripheral signals. The device module 421 may be affected by the voltage drop and/or the occurrence of noise of the supplied power. The device module 421 may malfunction or fail due to the voltage drop and/or noise of the supplied power.

The power control module 422 of the operating module 420 may receive the same power as the power that is supplied to the device module 421 by the power supply module 410. Therefore, the power input to the power control module 422 may be power in which the voltage drop and/or noise occurs due to the wiring. The power control module 422 may be located within the operating module 420 to thereby detect power in which the voltage drop and/or noise is introduced.

According to one embodiment, the power control module 422 may analyze the level and/or quality of the power supplied to the operating module 420 after detecting the power. As a result of the analysis, when the supplied power is unstable, the power control module 422 may control the power supply module 410 to adjust the level of the power. For example, when the level of the operating power is lower or higher than the level of rated power of the operating module 420, the power control module 422 may control the power supply module 410 to supply the rated power of the operating module 420.

The operating module 420 may be one semiconductor circuit or at least one PCBA module. When the operating module 420 is a semiconductor circuit, the power control module 422 and the device module 421 may be integrated into one semiconductor circuit. When the operating module 420 is a PCBA module, the power control module 422 and the device module 421 may be included in the same PCB. Thus, in the design of a PCB or a circuit, the operating power may be measured through the addition of a simple component (e.g., an analog-to-digital converter), and it is possible to miniaturize and integrate the operating module 420.

The processor 430 may access the power control module 422. The processor 430 may periodically or non-periodically access the operating power detected by the power control module 422 to analyze the level and/or quality of the power supplied to the operating module 420. As a result of the analysis, when the supplied power is unstable, the processor 430 may control the power supply module 410 to adjust the level of the supplied power. For example, when the level of the operating power is lower or higher than the level of the rated power of the operating module 420, the processor 430 may control the power supply module 410 to supply the rated power of the operating module 420. In addition, the processor 430 may control the operation of the operating module 420 to be changed according to the analyzed supplied power. Accordingly, it is possible to prevent the malfunction or error of the operating module 420, and to improve the operation of the operating module 420.

Figure 4B:
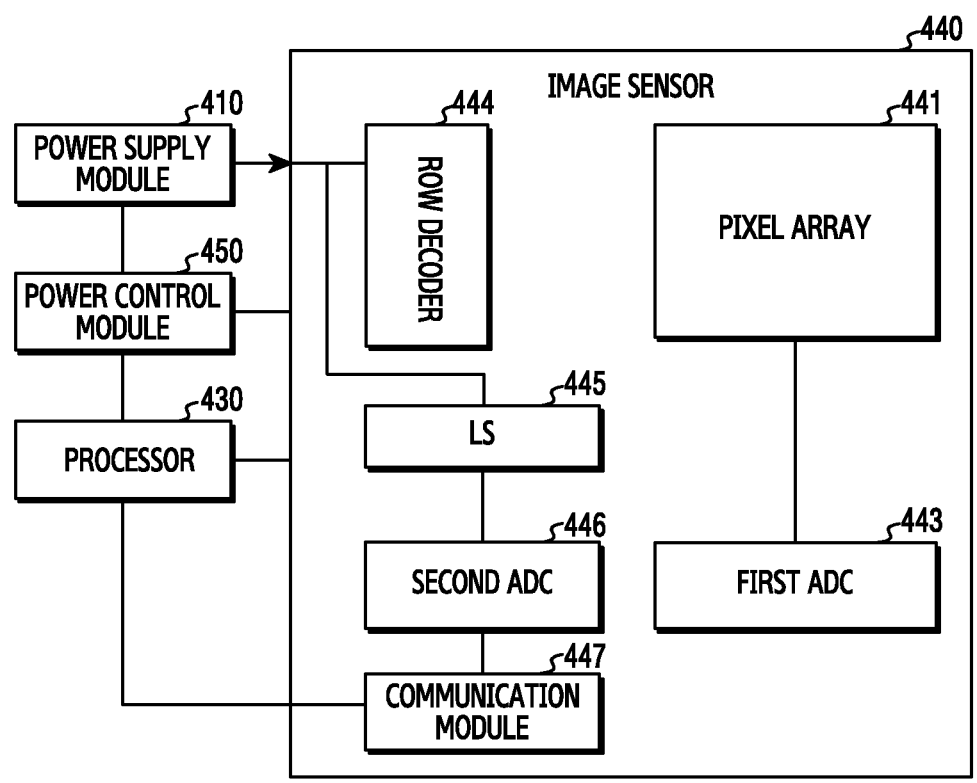
Figure 4C:
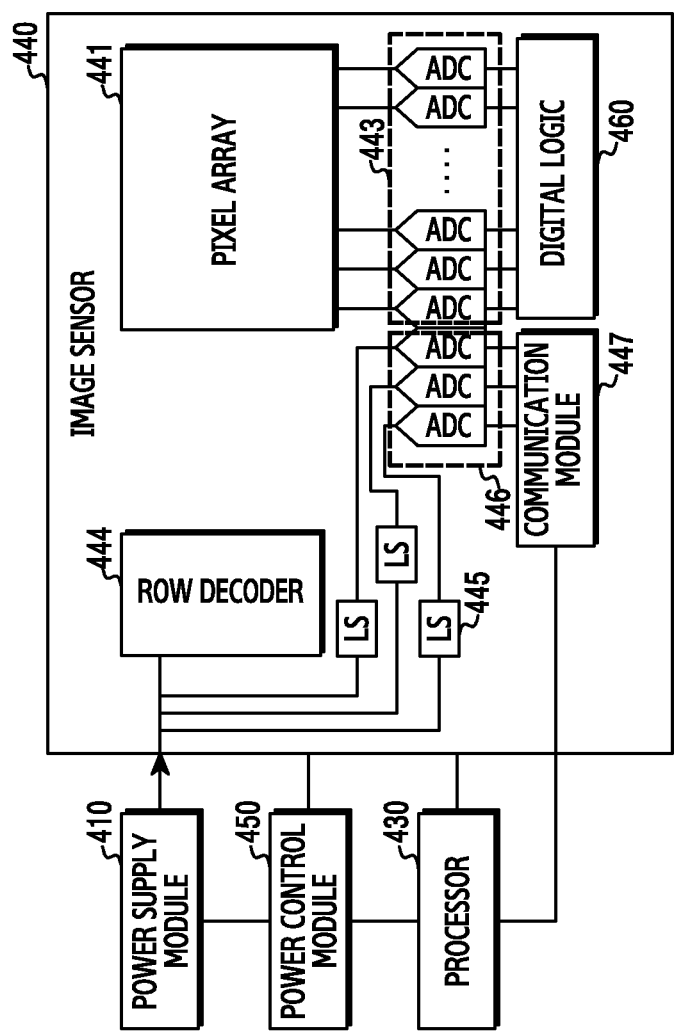

FIGS. 4B and 4C are block diagrams illustrating an electronic device according to various embodiments.

Referring to FIGS. 4B and 4C, an electronic device according to various embodiments may be, for example, an image sensor 440. The image sensor 440 may include, for example, a pixel array 441, an analog-to-digital converter (hereinafter, referred to as a "first ADC") 443 of a first group, an analog-to-digital converter (hereinafter, referred to as a "second ADC") 446 of a second group, a level shifter (hereinafter, referred to as an "LS") 445, and a communication module 447.

The pixel array 441 may include a plurality of pixels. The pixel array 441 may acquire an amount of light. The pixel may include, for example, one or more microlenses, one or more color filters, and one or more photodiodes.

The first ADC 443 may convert the amount of light acquired through the pixel array 441 into a first digital signal. The image sensor 440 may convert the amount of light acquired in the pixel array 441 into pixel data through the first ADC 443, and the pixel data may be output through a digital logic 460 including an image pipeline. The pixel data may be transmitted to the outside (e.g., an image signal processor or an application processor) through an interface such as a mobile industry processor interface (MIPI) or the like in the digital logic 460.

According to one embodiment, the second ADC 446 may be designed adjacent to the first ADC 443. As shown in FIG. 4C, the image sensor 440 may further include the second ADC 446 as an additional ADC in addition to the first ADC 443. The second ADC 446 may be an ADC with the same type as the first ADC 443. The second ADC 446 may be a component corresponding to the first ADC 443. For example, when operating power is supplied to each component of the image sensor 440 via three power supply lines at the power supply module 410, three second ADCs 446 are provided directly adjacent to the first ADC 443. The number of the second ADCs 446 may be added by the number of the power supply lines supplied from the power supply module 410. The same number of second ADCs 446 as the number of power sources supplied from the power supply module 410 to the image sensor 440 may be provided. Each of the second ADCs 446 may be connected to each power supply line. The second ADC 446 may detect a plurality of power sources supplied to the image sensor 440. The second ADC 446 may convert the power supplied to the image sensor 440 to a second digital signal. The electronic device according to various embodiments may measure the operating power through the addition of a simple component, such as the second ADC 446, when a PCB or a circuit is designed, and may be used for miniaturization and integration of the operating module such as the image sensor 440.

The image sensor 440 may further include the LS 445, and the LS 445 may be functionally connected to the second ADC 446. The LS 445 may receive power and may be configured to convert the level of the power to the available input range of the first ADC 443 and the second ADC 446. For example, as shown in FIG. 4C, the LS 445 may be connected to each second ADC 446.

The communication module 447 may be configured to output a first digital signal and/or a second digital signal to the outside of the image sensor 440. The communication module 447 may transmit the first digital signal and/or the second digital signal to the processor 430 or the power control module 450.

The image sensor 440 may include a power control module 450. The power control module 450 may be included in the image sensor 440. However, the embodiment is not limited thereto, and the power control module 450 may be provided outside the image sensor 440. The power control module 450 may be configured to control corresponding power using the second ADC 446. The power control module 450 may adjust the corresponding power when the second digital signal is out of a designated range. Alternatively, the power control module 450 may be configured to transmit the second digital signal to the processor 430 to adjust the power when the second digital signal is out of the designated range.

Figure 5:
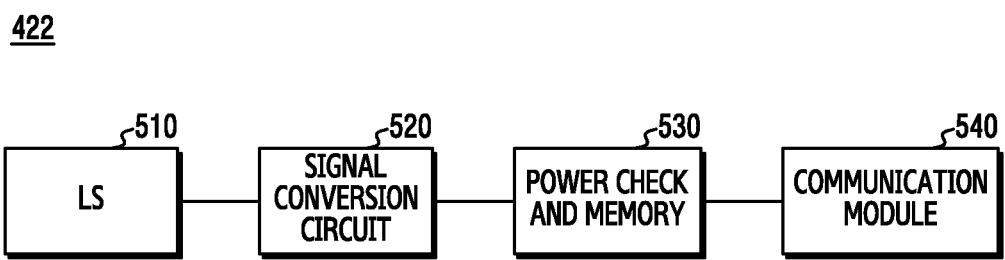
FIG. 5 illustrates a power control module in an electronic device according to various embodiments.

FIG. 5 illustrates the power control module 422 in an electronic device according to various embodiments.

Referring to FIG. 5, the power control module 422 may include a level shifter (LS) 510, a signal conversion circuit 520, a power check and memory 530, and a communication module 540.

The LS 510 may adjust the level of the supplied power output from the power supply module 410. The LS 510 may adjust the level of the supplied power output from the power supply module 410 to the level of power that can be processed by the signal conversion circuit 520. The LS 510 may be omitted as long as the level of the power supplied from the power supply module 410 is the level of power that can be processed by the signal conversion circuit 520.

The signal conversion circuit 520 may convert the power output from the LS 510 into power data. For example, the signal conversion circuit 520 may be an analog-to-digital converter (Hereinafter, referred to as an "ADC"). The ADC may convert analog power output from the LS 510 into digital data. The power data converted by the signal conversion circuit 520 may be power data in which a voltage drop is caused by the external wiring L1 and the internal wiring L2. In addition, the power data may be power data including noise introduced into the external wiring L1 and/or the internal wiring L2.

The power check and memory 530 may store the power data converted by the signal conversion circuit 520. The power check and memory 530 may be, for example, a memory, a register, or a buffer.

The communication module 540 may transmit signal information stored in the power check and memory 530 by a request of the processor 430. The communication module 540 may be an inter-integrated circuit (I2C) communication module that can be connected to the outside of the operating module 420. The communication module 540 may convert the power data stored in the power check and memory 530 into serial data and may transmit the serial data to the processor 430.

Figure 6:
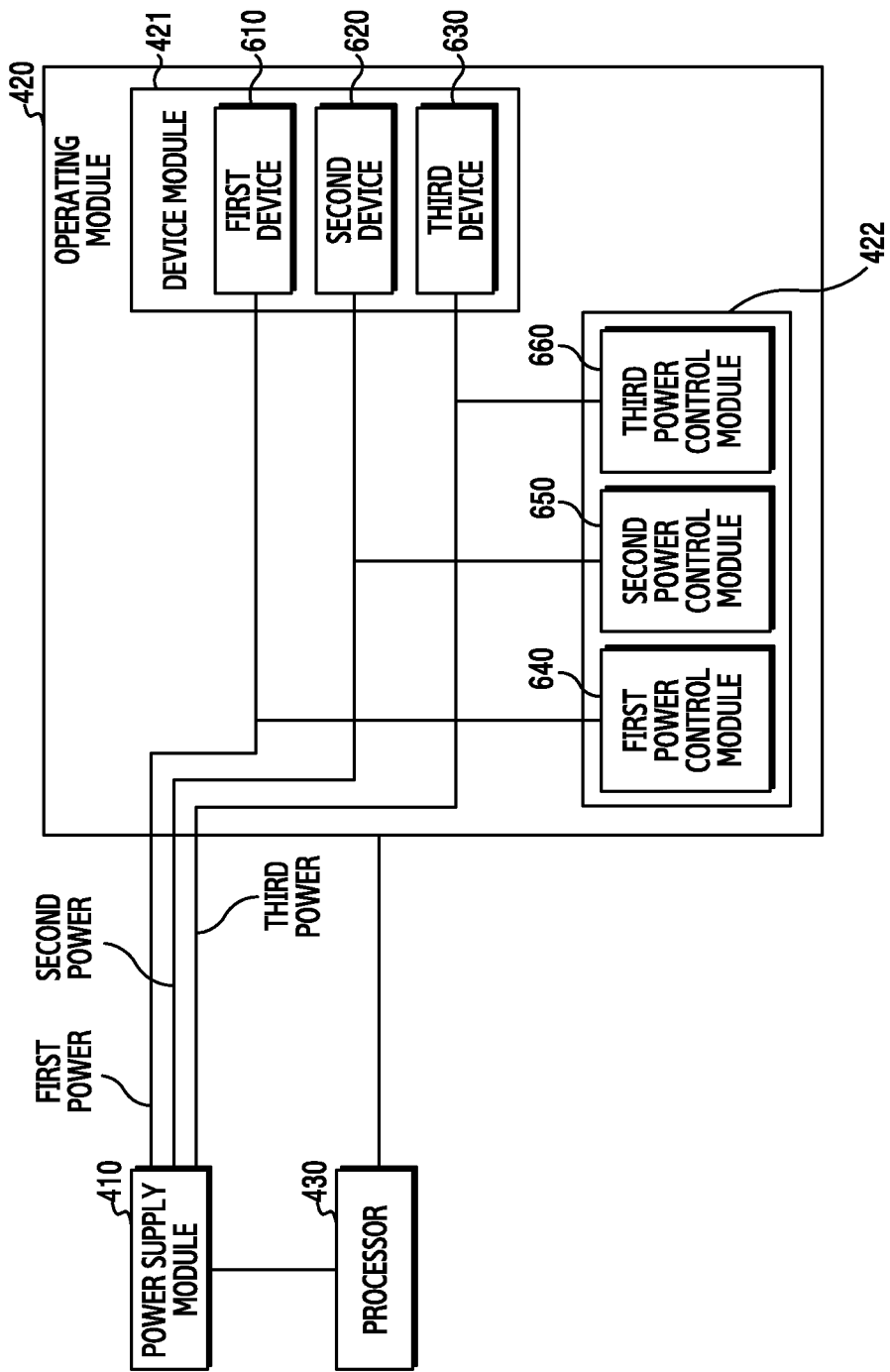
FIG. 6 is a block diagram illustrating an electronic device according to various embodiments.

FIG. 6 is a block diagram illustrating an electronic device according to various embodiments.

Referring to FIG. 6, an electronic device according to various embodiments may include, for example, a power supply module 410, an operating module 420, and a processor 430. The operating module 420 may include, for example, a device module 421 and a power control module 422, and the device module 421 may include a plurality of devices 610, 620, and 630. The plurality of devices 610, 620, 630 may be functionally connected to each other.

According to one embodiment, each of the plurality of devices 610, 620, and 630 may receive power from the power supply module 410. Each of the plurality of devices 610, 620, and 630 may use different power levels as operating power. The number of power supplies output from the power supply module 410 may vary depending on the number of devices 610, 620, and 630.

According to one embodiment, when there is a plurality of power supplies output from the power supply module 410, a plurality of power control modules 422 may be provided to detect the power output from the power supply module 410. The same number of power control modules 422 as the number of power levels generated from the power supply module 410 may be provided. Alternatively, a plurality of power control modules 422 may be provided according to the number of devices included in the device module 421. Alternatively, the power control module 422 may be provided according to the number of devices from which power is to be detected. Alternatively, the power control module 422 may be provided according to the type and characteristic of the power output from the power supply module 410, or the number of the power levels.

According to one embodiment, each component which constitutes the device module 421 and receives power from the power supply module 410 may be referred to as a device. The device module 421 may include a first device 610, a second device 620, and a third device 630. The first device 610, the second device 620, and the third device 630 may perform different functions. Each of the first device 610, the second device 620, and the third device 630 may use first power, second power, and third power of different levels as operating power.

The number of the power control modules 422 may be provided so as to detect the supplied power of the first power, the second power, and the third power. The power control module 422 may include a first power control module 640, a second power control module 650, and a third power control module 660.

According to one embodiment, the first power control module 640 may receive the same power as the first power supplied to the first device 610. The first power control module 640 may detect the first power. The second power control module 650 may receive the same power as the second power supplied to the second device 620. The second power control module 650 may detect the second power. The third power control module 660 may receive the same power as the third power supplied to the third device 630. The third power control module 660 may detect the third power.

For example, the first device 610 is an analog device operated by analog power, the second device 620 is a digital device operated by digital power, and the third device 630 is an I/O device operated by I/O power. The power supply module 410 may supply the analog power (first power), the digital power (second power), and the I/O power (third power) for operating each of the first device 610, the second device 620, and the third device 630. The power control module 422 may be configured to detect the power supplied from the power supply module 410. In this case, the power control module 422 may be constituted of a first power control module 640, a second power control module 650, and a third power control module 660, each of which may detect the analog power (first power), the digital power (second power), and the I/O power (third power).

According to one embodiment, the electronic device may use a plurality of power levels when a plurality of devices is the same type of devices (e.g., analog devices). For example, when the device module 421 includes an analog device using power of 9V and an analog device using power of 5V, the power supply module 410 may generate power of 9V and 5V to supply the generated power to the corresponding device. In this case, two power control modules 422 may be provided so as to detect each of 9V and 5V.

Figure 7A:
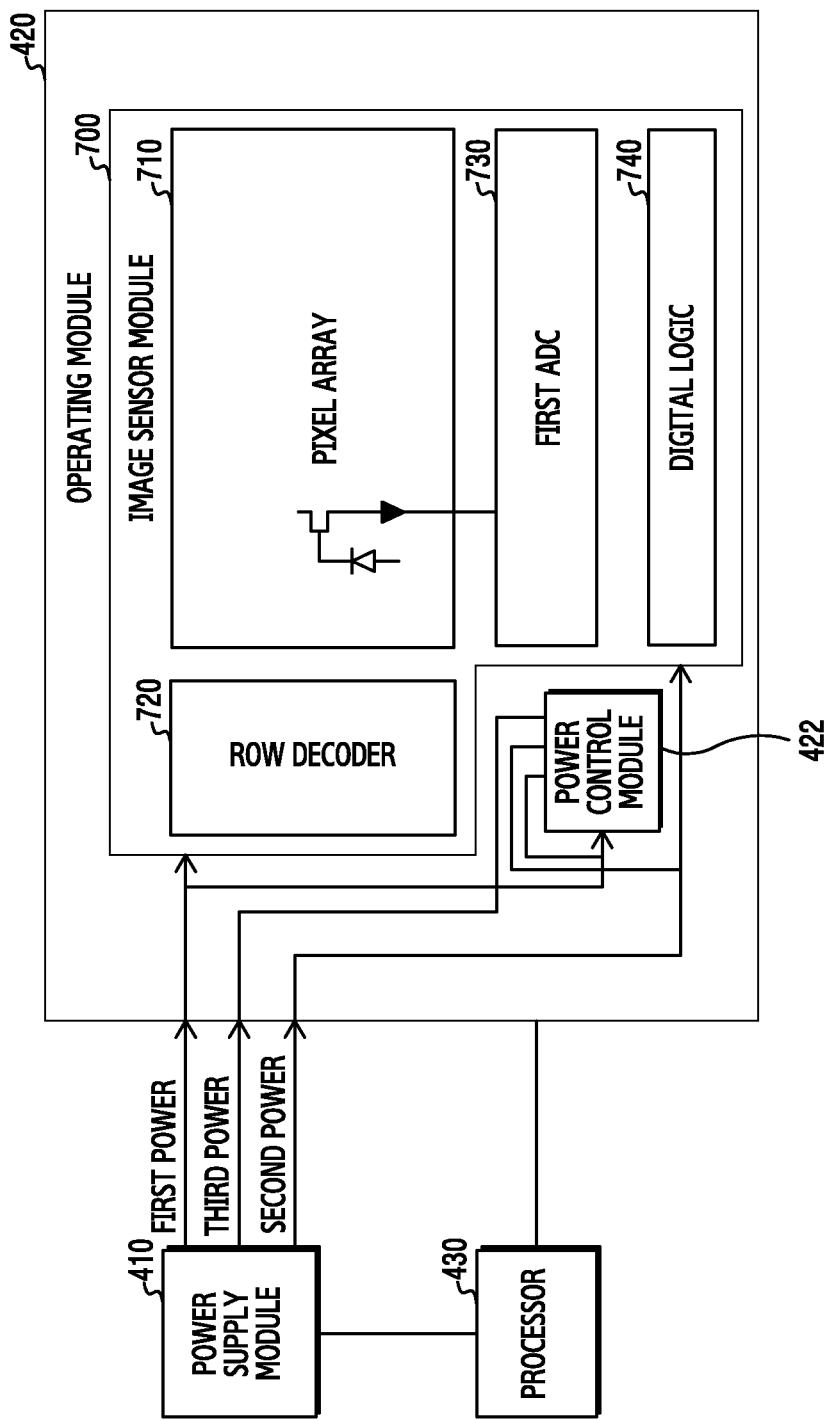
FIG. 7A is a block diagram illustrating an electronic device according to various embodiments.
Figure 7B:
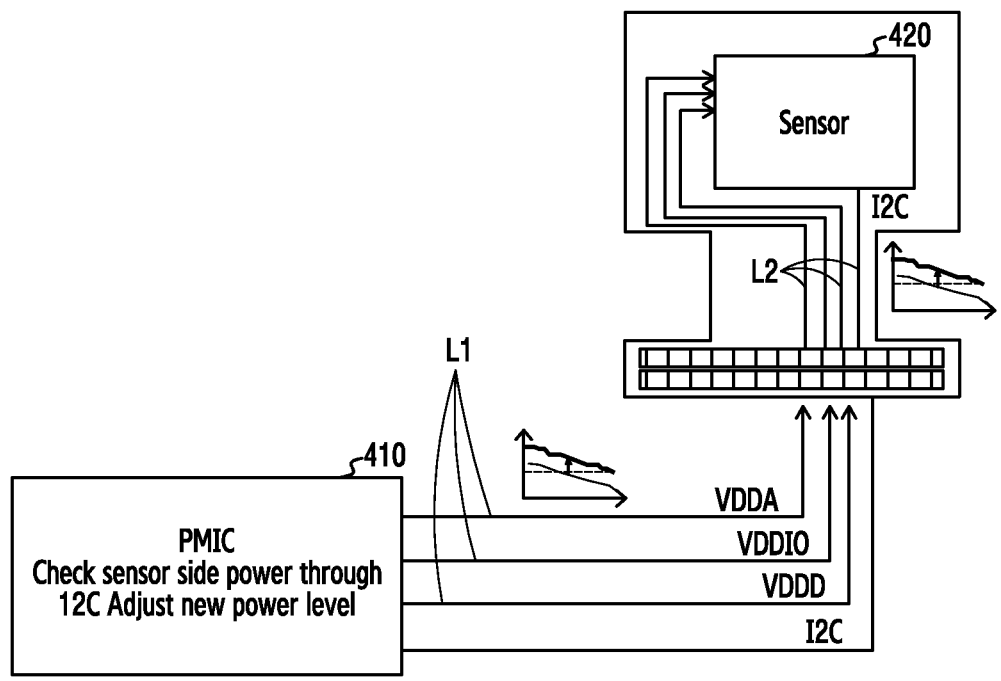
FIG. 7B illustrates an example of power supplied to an electronic device according to various embodiments.
Figure 8:
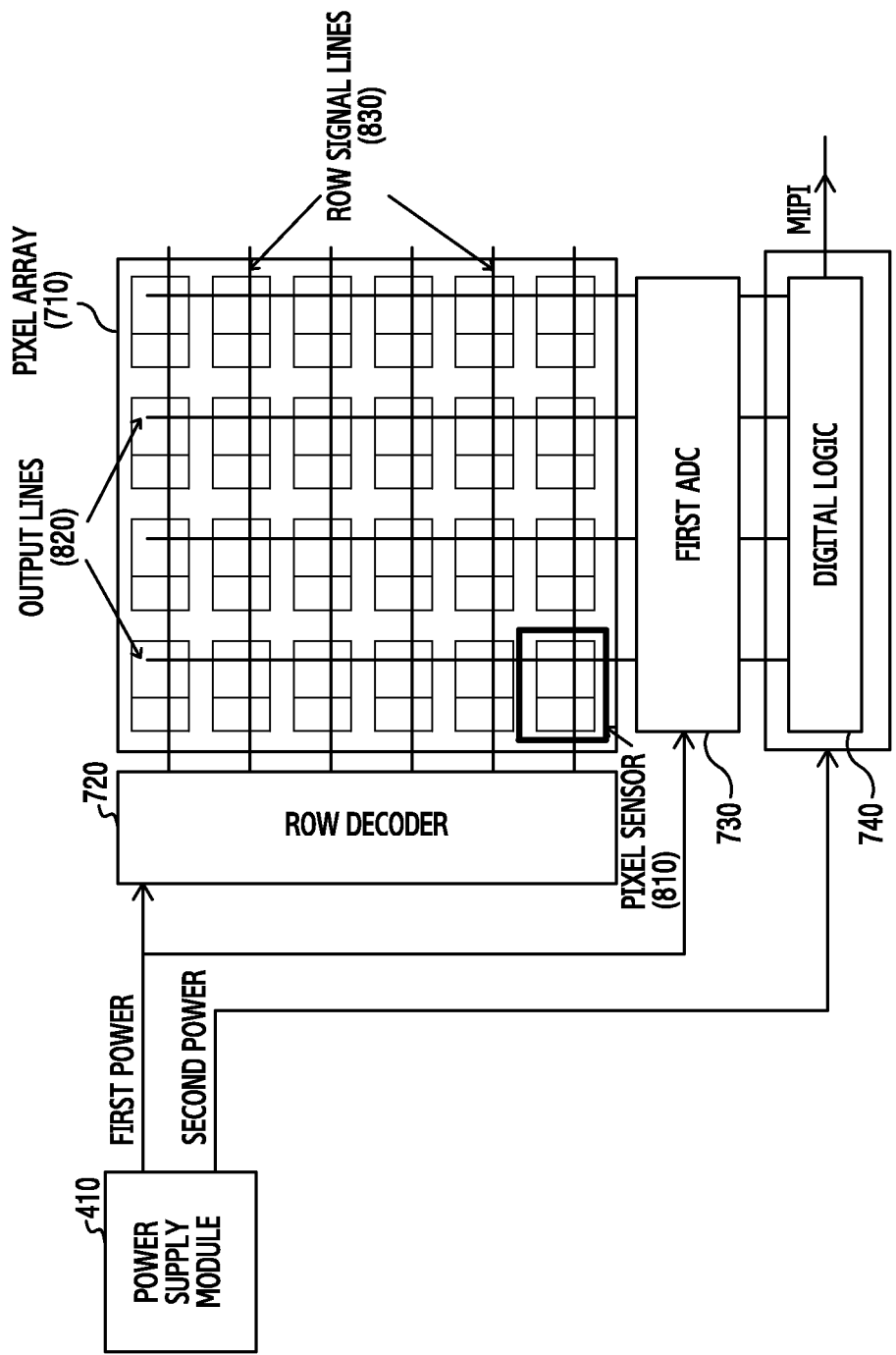
FIG. 8 is an enlarged view illustrating a device module in an electronic device according to various embodiments.
Figure 9:
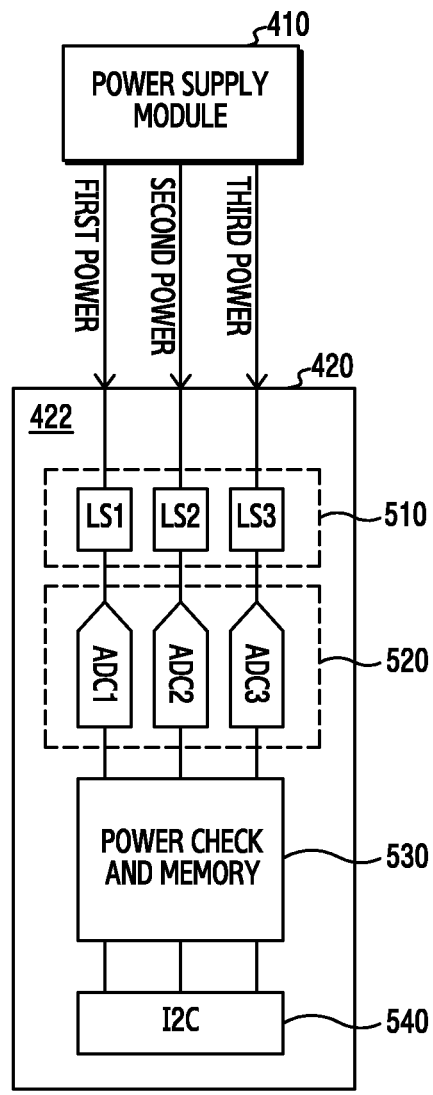
FIG. 9 is an enlarged view illustrating a power control module in an electronic device according to various embodiments.

FIG. 7A is a block diagram illustrating an electronic device according to various embodiments. In FIG. 7A, an example in which a device module is an image sensor module 700 is illustrated. FIG. 7B illustrates an example of power sources supplied to an image sensor module. FIG. 8 is an enlarged view illustrating an image sensor module 700 in an electronic device according to various embodiments, and FIG. 9 is an enlarged view illustrating the power control module 422 included in the image sensor module 700 in an electronic device according to various embodiments.

Referring to FIG. 7A, the power supply module 410 may supply power to the image sensor module 700. The power supply module 410 may supply at least one power source in order to perform the operation of the image sensor module 700. For example, the power supply module 410 may output the first power, the second power, and the third power to supply the output power to the image sensor module 700. The power supply module 410 may supply the first power, the second power, and the third power to the image sensor module 700 and the power control module 422. The power supply module 410 may supply the first power to the pixel array 710 or an analog-to-digital converter (hereinafter, referred to as a "first ADC") 730 of a first group. The power supply module 410 may supply the second power to the digital circuit of the image sensor module 700. The power supply module 410 may supply the third power to the I/O of the image sensor module.

As shown in FIG. 7B, the first power may be analog power $V_{DDA}$ (analog input power), the second power may be digital power $V_{DDD}$ (digital input power), and the third power may be I/O power $V_{DDIO}$ (I/O input power).

Referring to FIG. 8, the image sensor module 700 may include, for example, the pixel array 710, a row decoder 720, a first ADC 730, and a digital logic 740.

The pixel array 710 may be operated by first power and may include a plurality of pixel sensors 810. Each pixel sensor 810 may convert an optical signal into an electrical signal. Each pixel sensor 810 may include, for example, one or more microlenses, one or more color filters, and one or more photodiodes. The microlense may condense light incident from the outside. The color filter may include at least one of a red filter, a green filter, and a blue filter per pixel. The red filter may pass light in the red wavelength band. The green filter may pass light in the green wavelength band. The blue filter may pass light in the blue wavelength band. The photodiode may convert an optical signal into an electrical signal and may output the converted result through a plurality of output lines 820.

The row decoder 720 may be operated by the first power and may drive the pixel array 710. The row decoder 720 may apply driving signals such as selection signals, reset signals, and transmission signals to the pixel array 710 through row signal lines 830 to select line pixels of the pixel array 710. The pixel array 710 may provide a pixel signal, which is an electrical signal sensed by each of the pixels, to the first ADC 730 through a plurality of output lines 820 in response to the driving signals of the row decoder 720.

The first ADC 730 may be operated by the first power and may convert a pixel signal provided from the pixel array 710 into a first digital signal. The image sensor module 700 may convert an amount of light acquired in the pixel array 710 into pixel data via the first ADC 730, and the pixel data may be output through the digital logic 740 including an image pipeline. The pixel data may be transmitted to the outside (e.g., an image signal processor or an application processor) via an interface such as an MIPI in the digital logic 460.

The pixel array 710 or the first ADC 730 may use the first power as operating power. The digital circuit of the image sensor module 700 may use the second power as the operating power. The I/O device of the image sensor module 700 may use the third power as the operating power.

Referring to FIG. 7A, the power control module 422 may detect each of the first power, the second power, and the third power supplied to the image sensor module 700 as power data, and may store the detected power data. The power control module 422 may transmit the stored power data to the processor 430 in an I2C communication method.

Referring to FIG. 9, the power control module 422 may include, for example, the LS 510, the signal conversion circuit 520, the power check and memory 530, and the (I2C) communication module 540. The power check and memory 530 may be accessible from the outside via an external interface (e.g., I2C) of the image sensor module 700. The LS 510 may include, for example, an LS 1, an LS 2, and an LS 3. The signal conversion circuit 520 may include, for example, an ADC 1, an ADC 2, and an ADC 3.

The first power control module 640 may be constituted of, for example, the LS 1 and the ADC 1. The first power control module 640 may detect first power that is the same as the first power supplied to the pixel array 710 or the first ADC 730. The second power control module 650 may include, for example, the LS 2, the ADC 2, the power check and memory, and the I2C. The second power control module 650 may detect the second power supplied to the digital circuit. The third power control module 660 may include, for example, the LS 2, the ADC 2, the power check and memory, and the I2C. The third power control module 660 may detect third power supplied to the I/O device of the image sensor.

The LS 510 may adjust the level of the supplied power output from the power supply module 410. All or some of the power sources supplied from the power supply module 410 may exceed an available input range of the signal conversion circuit 520. The LS 1, LS 2, and LS 3 of the LS 510 may adjust the levels of the first power, the second power, and the third power corresponding to the available input ranges of the ADC 1, the ADC 2, and the ADC 3 of the signal conversion circuit 520. Each of the ADC 1, the ADC 2, and the ADC3 of the signal conversion circuit 520 may be an analog-to-digital converter (Hereinafter, referred to as a "second ADC") of a second group corresponding to the first ADC 730 of the image sensor module 700. The second ADC 520 may be an ADC with the same type as the first ADC 730. The second ADC 520 may be designed adjacent to the first ADC 730. The second ADC 520 may be designed to have the same configuration as the first ADC 730. The second ADC 520 may be configured to be driven by the same control signal as a control signal applied to the first ADC 730. That is, the image sensor module 700 may further include the second ADC 520 as an additional ADC in addition to the first ADC 730. The second ADC 520 may convert the operating power of the image sensor module 700 into a second digital signal. The second ADC 520 may convert the operating power of the image sensor module 700 into power data. That is, the input of the second ADC 520 may not be a pixel signal output from the photodiode of the pixel array 710, but may be power sources supplied by the power supply module 410. The ADC 1 may convert the first power into first power data which is a digital signal. The ADC 2 may convert the second power into second power data which is a digital signal. The ADC 3 may convert the third power into third power data which is a digital signal.

The power check and memory 530 may store the first power data, the second power data, and the third power data converted by the ADC 1, the ADC 2, and the ADC 3. The power stored in the power check and memory 530 may be power whose voltage has been lowered by wiring or whose level has been changed by a noise input. The power data stored in the power check and memory 530 may be transmitted to an external device (e.g., the processor 430) upon the request of the processor 430 or periodically.

The communication module 540 may transmit signal information stored in the power check and memory 530 upon the request of the processor 430. For example, the communication module 540 may be inter-integrated circuit (I2C) communication module. The communication module 540 may convert the power data stored in the power check and memory 530 into serial data using a serial clock line (SCK) and a serial data line (SDA), and may transmit the converted result to the processor 430. The communication module 540 may convert each of the first power data, the second power data, and the third power data into serial data, and may transmit the converted result to the processor 430.

Referring again to FIG. 7A, the processor 430 may access the power data stored in the power control module 422 to analyze the respective power levels and qualities. That is, without an external connection device (e.g., a tester, etc.), the electronic device may receive and analyze the power sources supplied to the image sensor module 700 through the power control module 422. The processor 430 may control the power supply module 410 to supply the adjusted power when the level of the supplied power is lower or higher than the level of the rated power of the image sensor module 700 through analysis. In addition, the processor 430 may control the operation of the image sensor module 700 to be changed according to the analyzed supplied power. Accordingly, it is possible to prevent a malfunction or error in the operating module 420 and to improve the operation of the image sensor module 700. As a result, the stability of the image sensor module 700 may be secured, and the image quality and noise may be improved.

Figure 10:
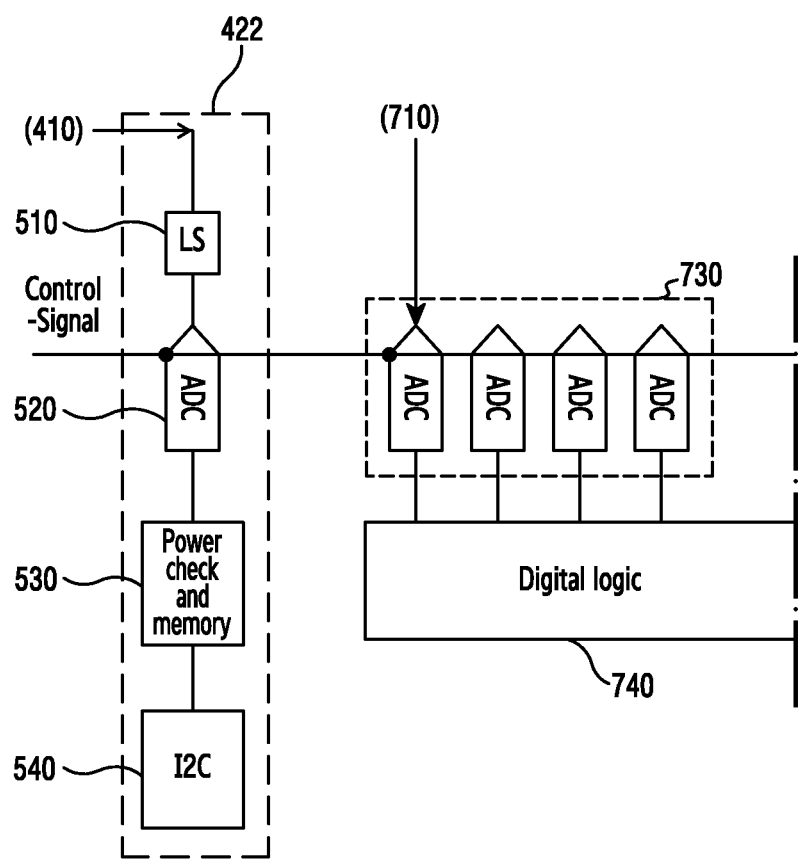
FIG. 10 illustrates a power control module in an electronic device according to various embodiments.

FIG. 10 illustrates the power control module 422 in an electronic device according to various embodiments.

Referring to FIG. 10, the first ADC 730 of the image sensor module 700 and the second ADC 520 of the power control module 422 may be ADCs with the same type, and each thereof may share one or more of the same control signals. That is, the same ADC operation can be enabled by sharing the output of control signals of the first ADC 730 for reading pixel data and the second ADC 520 for power check. The control signal may be a digital signal required for the ADC operation, a ramp signal output from a ramp generator, or the like. The first ADC 730 may use, as an input, an output from the photodiode using an optical signal as an input, and the second ADC 520 may use the power transmitted to the image sensor module 700 as an input. Accordingly, the controller (e.g., the processor 430 or a separate image processor) of the image sensor module 700 may control the first ADC 730 in conjunction with the second ADC 520 when controlling the first ADC 730. Accordingly, it is not necessary to separately control the power control module 422 located within the operating module 420, so that the control method may be simplified. In this case, the power control module 422 may generate power detection data at a cycle of outputting column pixel data from the image sensor module 700.

Meanwhile, the embodiment is not limited thereto, and the first ADC 730 and the second ADC 520 may be controlled independently of each other. For example, the second ADC 520 may be driven only when there is a separate request from a user or the processor 430. Meanwhile, the embodiment is not limited thereto, the image sensor module 700 may include the power control module 422 and the power control module 422 may directly detect an analog signal output from the image sensor module 700. That is, the power control module 422 may be provided inside the image sensor module 700 and may detect the power without converting an analog signal into a digital signal. Accordingly, the power control module 422 may omit the signal conversion circuit 520 and may detect the power using the analog signal.

Figure 11:
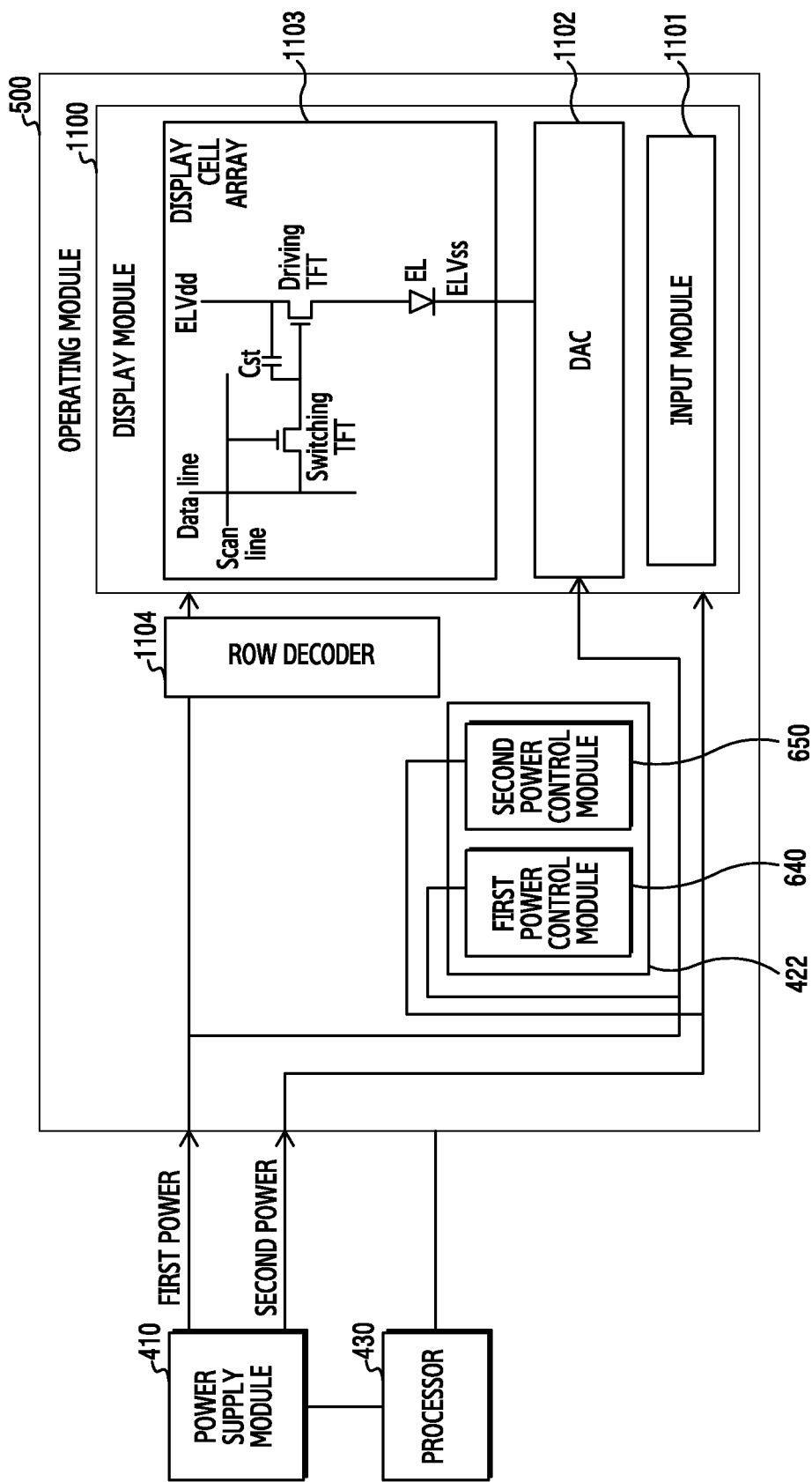
FIG. 11 is a block diagram illustrating an electronic device according to various embodiments.
Figure 12:
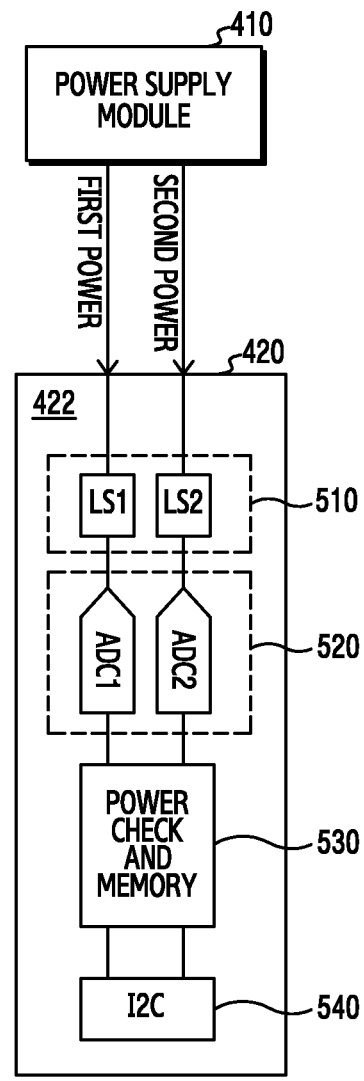
FIG. 12 illustrates a power control module in an electronic device according to various embodiments.

FIG. 11 is a block diagram illustrating an electronic device according to various embodiments. FIG. 11 shows an example in which the device module is a display module 1100. The display module 1100 may be a display unit applied to electronic devices such as a smart phone, a tablet PC, and the like. FIG. 12 illustrates a power control module in an electronic device according to various embodiments.

The display module 1100 included in the operating module 500 of the electronic device according to various embodiments may include an input module 1101, a digital-to-analog converter (hereinafter, referred to as a "DAC") 1102, a display cell array 1103, a row decoder 1104, and the like.

The input unit 1101 may input pixel data applied from the outside (e.g., a graphics processor unit (GPU) or an application processor) of the display module 1100. The DAC 1102 may convert the pixel data input through the input unit 1101 into an analog pixel signal. The row decoder 1104 may select a line of the cell array for displaying the pixel signal. The display cell array 1103 may display the analog pixel signal converted by the DAC 1102 on the cells of the line selected by the row decoder 1104.

The display cell array 1103 may include display elements (e.g., an LCD or an LED) for displaying pixel data, and the display elements may be arranged in a matrix form. The display cell array 1103 may include data lines and scan lines for transmitting and selecting display data to the display elements, and the data lines and the scan lines may be arranged to intersect with each other. When the display data is output to the data lines and the scan lines are activated, color filters positioned on the corresponding line may be polarized by the corresponding data signal to display color data. When the row decoder 1104 sequentially selects the scan lines of the display cell array 1103 and outputs the data of the corresponding lines, the display cell array 1103 may display the pixel data.

The input unit 1101 may use the second power as the operating power. The DAC 1102 and/or the display cell array 1103 may use the first power as the operating power. The input unit 1101 may be a digital device, and the DAC 1102 and the display cell array 1103 may be analog devices.

The power supply module 410 may supply the second power to the input unit 1101. The power supply module 410 may supply the first power to the DAC 1102 and/or the display cell array 1103. Here, the first power may be power supplied to the analog device, and the second power may be power supplied to the digital device.

In an electronic device according to various embodiments, the power control module 422 may be provided to detect the supplied power of the first power and the second power. The power control module 422 may include a first power control module 640 and a second power control module 650. Referring to FIG. 12, each of the first power control module 640 and the second power control module 650 may include the LS 510, the signal conversion circuit 520, the power check and memory 530, and the communication module 540. The LS 510 may include the LS 1 and the LS 2. The signal conversion circuit 520 may include the ADC 1 and the ADC 2.

The signal conversion circuit 520 of the power control module 422 may convert the operating power of the display module 1100 into power data. That is, the signal conversion circuit 520 of the power control module 422 may be an ADC, and the ADC input may be power sources supplied from the power supply module 410 rather than the pixel data input to the display module 1100. That is, it can be seen that the input of the ADC (signal conversion circuit 520) of the power control module 422 is not the pixel signal applied to the display cell array 1103. At this time, when the values of the first power and the second power supplied from the power supply module 410 exceed the available input range of the ADC (signal conversion unit 520), the power may be adjusted to the available input range via the corresponding LS 1 and LS 2 of the LS 510. That is, the LS 1 and the LS 2 of the LS 510 may respectively adjust the levels of the corresponding first power and second power to the available input ranges of the ADC 1 and the ADC 2 of the corresponding signal conversion circuit 520.

According to one embodiment, the control of each of the ADC (signal conversion unit 520) for power check and the DAC 1102 for converting pixel data into pixel signals may be performed at the same cycle. That is, the power control module 422 may generate power detection data at a row decoding period in which the pixel signals are displayed in the display module 1100.

The power check and memory 530 of the power control module 422 may convert the power supplied to the display module 1100 into power data, and may store the converted result. The stored power may be accessed and analyzed by the processor 430. At this time, when it is determined that the power supplied to the display module 1100 is abnormal power due to voltage drop or noise, the processor 430 may control the power supply module 410 to adjust the supplied power to stable power.

Figure 13:
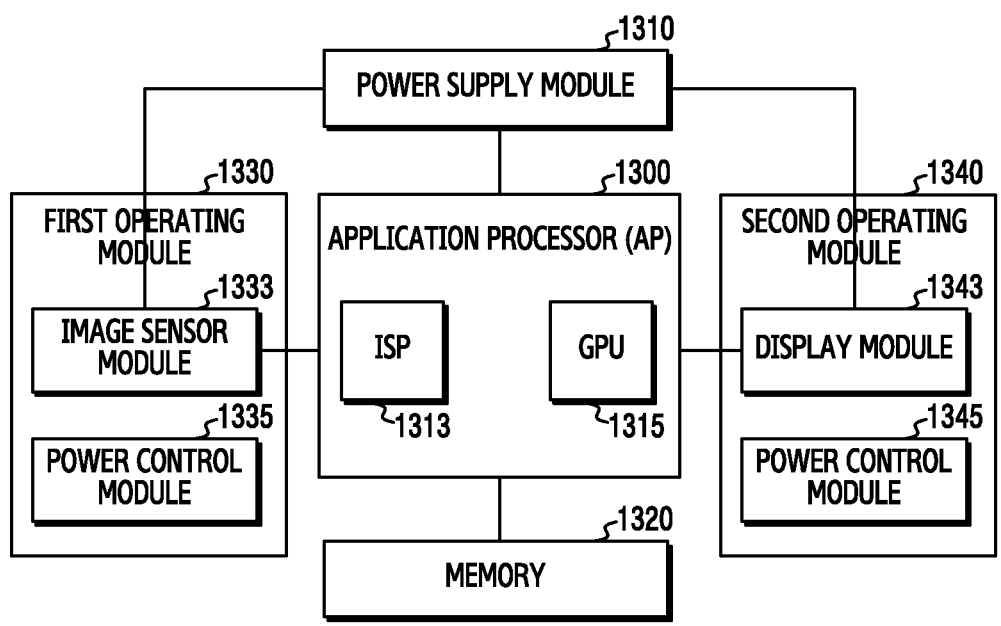
FIG. 13 is a block diagram illustrating an electronic device according to various embodiments.

FIG. 13 shows an example of an electronic device in which an operating module according to various embodiments includes a power control module. The electronic device may be a mobile terminal device.

Referring to FIG. 13, an electronic device (e.g., the electronic device 101) may include, for example, an application processor (AP) 1300, a power supply module 1310, a memory 1320, a first operating module 1330, and a second operating module 1340.

The AP 1300 may be functionally connected to the power supply module 1310, the memory 1320, the first operating module 1330, and the second operating module 1340. The AP 1300 may include the processor 430 of FIG. 4.

The memory 1320 may store programs for detecting and controlling the power of the first operating module 1330 and the second operating module 1340 according to various embodiments of the present disclosure.

The first operating module 1330 may include an image sensor module 1333 and a power control module 1335 capable of detecting the power supplied to the image sensor module 1333. The image sensor module 1333 may be operated by the power supplied from the power supply module 1310, and may process an image obtained from a camera (not shown) to output pixel data. The image sensor module 1333 may have the same configuration as the image sensor module 700 of FIG. 7A. The power control module 1335 may detect the power supplied to the image sensor module 1333 and may be accessed by the AP 1300.

The second operating module 1340 may include a display module 1343 and a power control module 1345 capable of detecting the power supplied to the display module 1343. The display module 1343 may be operated by the power supplied from the power supply module 1310 and may display pixel data output from the AP 1300. The display module 1343 may have the same configuration as the display module 1100 of FIG. 11. The power control module 1345 may detect the power supplied to the display module 1343 and may be accessed by the AP 1300.

The AP 1300 may further include an image signal processing module 1313 for processing pixel data output from the image sensor module 1333 and a graphic processor unit module 1334 for outputting display data to the display module 1343.

The AP 1300 may process the pixel data processed by the image sensor module 1333 into a preview image, may process the preview image into a still image or a moving image under the control of a user, and may store the processed image in the memory 1320. In addition, the AP 1300 may access and analyze the power data supplied to the image sensor module 1333 through the power control module 1335. The AP 1300 may control the power supply module 1310 to supply the rated power of the image sensor module 1333 when the power data is analyzed and is out of the rated power range of the image sensor module 1333.

According to one embodiment, the AP 1300 may output display data to the display module 1343. The display data output to the display module 1343 may be data of an application processed in the mobile data. For example, when a camera application is executed, the AP 1300 may display a preview image on the display module 1343 and may display the processed still image data or moving image data on the display module 1343. In addition, the AP 1300 may access and analyze the power data supplied to the display module 1343 through the power control module 1345. When the power data is analyzed and is out of the rated power range of the display module 1343, the AP 1300 may control the power supply module 1310 to supply the rated power of the display module 1343.

The electronic device according to various embodiments has been described in which the first operating module 1330 and the second operating module 1340 are applied to the image sensor module 1333 or the display module 1343. However, the embodiment is not limited thereto, and they can be applied to various operation modules.

According to various embodiments, the image sensor 440 may include the pixel array 441 including a plurality of pixels, the ADC 443 of the first group for converting an amount of light obtained through the pixel array 441 into a first digital signal, and the ADC 446 of the second group, which is adjacent to the ADC 443 of the first group, for converting the power supplied to the image sensor 440 into a second digital signal.

According to various embodiments, the image sensor 440 may further include the power control module 450, wherein the power control module 450 may be configured to control the power using the ADC 446 of the second group.

According to various embodiments, the image sensor 440 may include the communication module 447, wherein the communication module 447 may be configured to output the first digital signal to the outside of the image sensor 440.

According to various embodiments, the image sensor 440 may further include the power control module 450, and the power control module 450 may be configured to control the power using the second group 446.

According to various embodiments, when the second digital signal is out of a designated range, the second group 446 may be configured to transmit the second digital signal to the processor 430 functionally connected to the image sensor 440 so that the power control module 450 located outside the image sensor 440 may adjust power the corresponding power.

According to various embodiments, the image sensor 440 may further include the LS 445 functionally connected to the second group 446, and the LS 445 may be configured to receive the corresponding power and to convert the level of the power into the available input range of the first group 443 and the second group 446.

According to various embodiments, the power supply module 410 and the image sensor 440 may be provided. The image sensor 440 may include the pixel array 441 including a plurality of pixels, the ADC 443 of the first group for converting the amount of light obtained through the pixel array 441 into the first digital signal, and the ADC 446 of the second group, which is adjacent to the first group 443, for converting the power from the power supply module 410 to the image sensor 440 into the second digital signal.

According to various embodiments, the image sensor 440 may further include the power control module 450, wherein the power control module 450 may include the power check and memory 530 for storing the second digital signal and the communication module 447 for outputting the second digital signal.

According to various embodiments, the image sensor 440 may include a plurality of devices 441, 444, and 443, and a plurality of ADCs 446 of the second group may be provided.

According to various embodiments, the plurality of devices may include the first device 441 for receiving first power and the second device 444 for receiving second power, and the ADC 446 of the second group may include a first ADC 1 of the second group for converting the first power into a digital signal and a second ADC 2 of the second group for converting the second power into a digital signal.

According to various embodiments, the same number of ADCs 446 of the second group as the number of power sources generated in the power supply module 410 may be provided.

According to various embodiments, the ADC 446 of the second group may be configured to be driven by the same control signal as the control signal applied to the ADC 443 of the first group.

According to various embodiments, the image sensor 440 may further include the LS 445, and the LS 445 may be configured to adjust the first power to the available input range of the first ADC 446 of the second group and to adjust the second power to the available input range of the second ADC 446 of the second group.

According to various embodiments, the communication module 447 may include the I2C communication module, and may be configured to be accessed by the processor 430 functionally connected to the image sensor 440 and to transmit the second digital signal to the processor.

According to various embodiments, the electronic device may include an image sensor 700, the power supply module 410 for supplying power to the image sensor 700, and the power control module 422 provided inside the image sensor 700, wherein the power control module 422 may measure power and may be configured to transmit corresponding feedback to the power supply module 410 when the corresponding power is out of a designated range.

According to various embodiments, the image sensor 700 may output an analog signal, and the power control module 422 may be configured to measure the analog signal.

According to various embodiments, the corresponding power may be configured to be controlled using the analog signal.

According to various embodiments, the power control module 442 may further include the power check and memory 530 that stores the analog signal, and the power control module 422 may be configured to output the stored analog signal by the processor 430 functionally connected to the power control module 422.

According to various embodiments, when the analog signal is out of a designated range, the power control module 422 may be configured to transmit the analog signal to the processor 430 so as to adjust the corresponding power.

Figure 14:
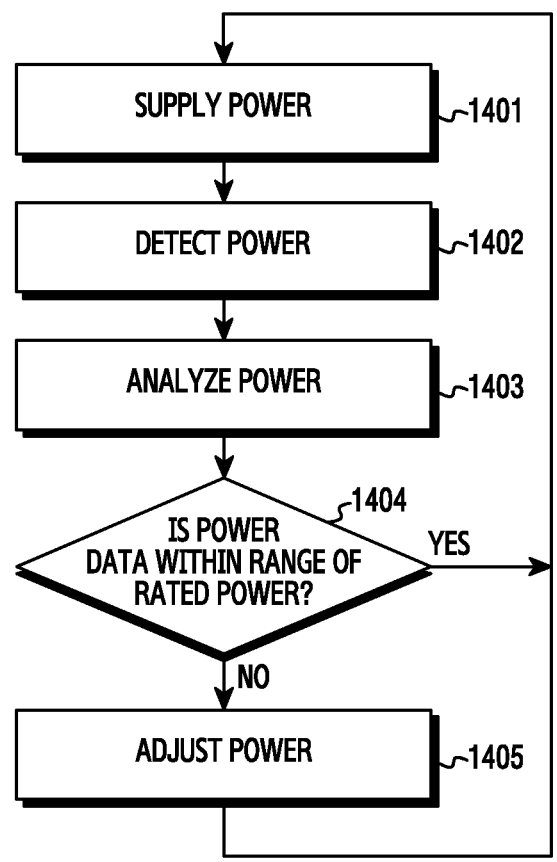
FIG. 14 is a flowchart illustrating a method of driving an electronic device according to various embodiments.

FIG. 14 is a flowchart illustrating a method in which an electronic device according to various embodiments controls power.

Referring to FIG. 14, in operation 1401, an electronic device (e.g., the power supply module 410) may supply operating power to the operating module 420. The supplied power may be applied to each of the device module 421 and the power control module 422 of the operating module 420. In operation 1402, the electronic device (e.g., the power control module 422) may detect the level of the supplied power. That is, the power control module 422 may detect the level of the power supplied to the device module 421, and may store the detected power data.

In operation 1403, the electronic device (e.g., the processor 430) may access and analyze the detected power data. In operation 1404, the electronic device (e.g., the processor 430) may determine whether the detected power data is within a range of rated power on the basis of the analyzed result. When the power data has the value of the rate power, the electronic device (e.g., the processor 430) may detect this in operation 1404 and may return to operation 1401. However, when the power data is out of the value of the range of rated power, the electronic device (e.g., the processor 430) may detect this in operation 1404 and may control the power supply module 410 in operation 1405 so that the power supplied to the device module 421 becomes the level of the rated power.

Figure 15:
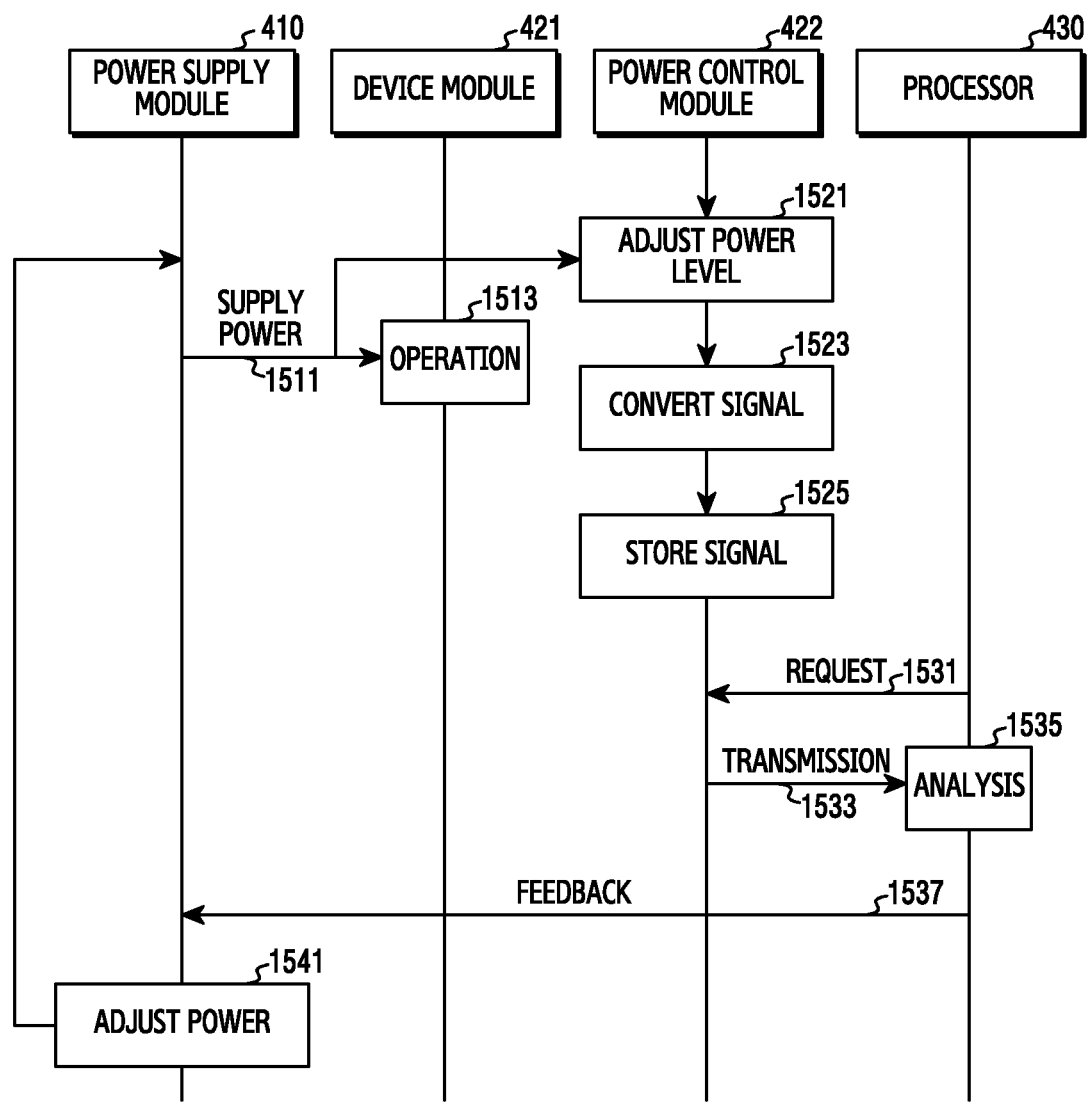
FIG. 15 is a flowchart illustrating a method of driving an electronic device according to various embodiments.

FIG. 15 is a flowchart illustrating a method of driving an electronic device according to various embodiments.

Referring to FIG. 15, in operation 1511, the power control module 422 and the device module 421 may receive power from the power supply module 410. When the power is supplied, the device module 421 may be driven to perform a corresponding function in operation 1513. When the power is supplied, the power control module 422 may adjust the level of the supplied power to an available input range of the signal conversion circuit 520 in operation 1521, and may convert the power whose level is adjusted into power data in operation 1523. The power control module 422 may store the converted power data in operation 1525.

At this time, when first power that is operating power of an analog circuit and second power that is operating power of a digital circuit are supplied in operation 1511, the power control module 422 may perform a first signal conversion operation for converting the first power into first power data and a second signal conversion operation for converting the second power into second power data in operation 1523. In operation 1525, the power control module 422 may store first power data converted into a first signal and the second power data converted into a second signal.

The processor 430 may request the transmission of the power data from the power control module 422 in operation 1531, and the power control module 422 may transmit the stored power data to the processor 430 in operation 1533. The processor 430 may analyze the transmitted power data in operation 1535. When the level of the supplied power is lower than or higher than the level of the rated power of the operating module 420 on the basis of the analysis, the processor 430 may control the power supply module 410 to supply the adjusted power in operation 1537. In operation 1541, the power supply module 410 may change the level of the power supplied to the device module 421. Accordingly, it is possible to prevent a malfunction or error in the operating module 420 and to improve the operation of the operating module 420.

Figure 16:
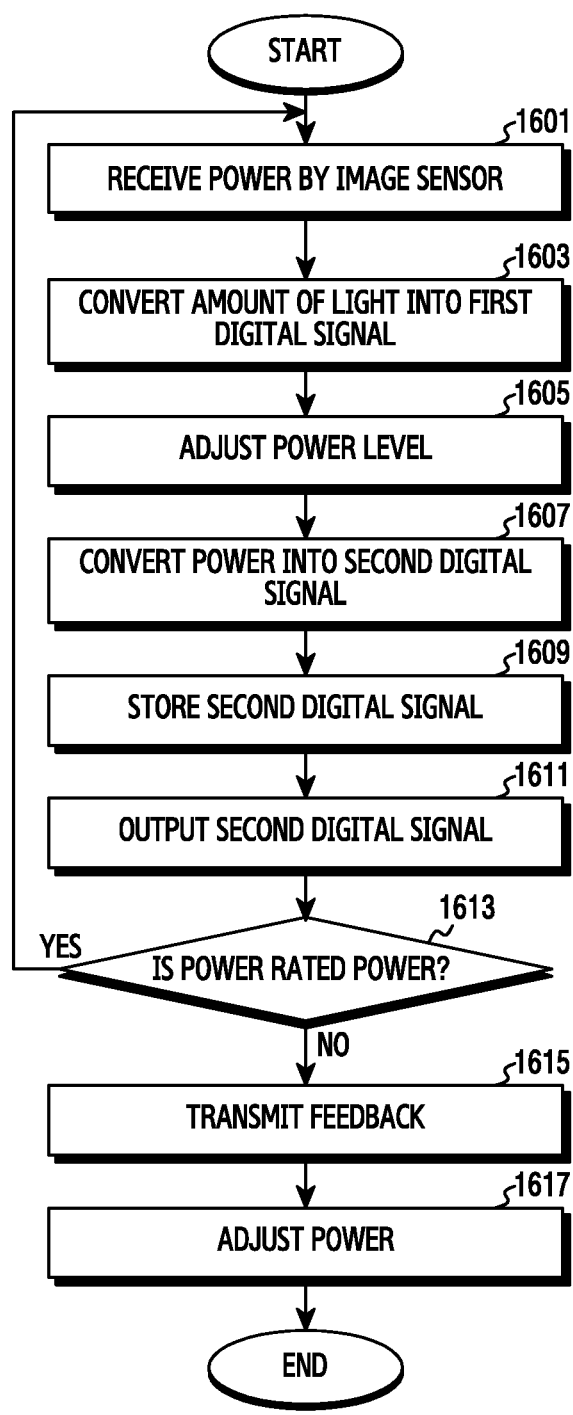
FIG. 16 is a flowchart illustrating a method of driving an electronic device according to various embodiments.

FIG. 16 is a flowchart illustrating a method of driving an electronic device according to various embodiments.

Referring to FIG. 16, in operation 1601, an electronic device (e.g., the image sensor 700) may perform an operation of receiving power. The electronic device (e.g., the image sensor 700) may be operated by receiving power supplied from the power supply module 410.

In operation 1603, an electronic device (e.g., the ADC 730 of the first group) may perform an operation of converting an amount of light into a first digital signal. The electronic device (e.g., the pixel array 710) may acquire the amount of light, and the electronic device (e.g., the ADC 730 of the first group) may convert the acquired amount of light into the first digital signal.

In operation 1605, the electronic device (e.g., the LS 510) may adjust the level of the received power. In operation 1605, the electronic device (e.g., the LS 510) may adjust the power of the received power into the level of power that can be processed by the ADC 520 of the second group.

In operation 1607, the electronic device (e.g., the ADC 520 of the second group) may convert the received power into a second digital signal. In operation 1607, the electronic device (e.g., the ADC 520 of the second group) may convert the power whose level is adjusted into the second digital signal.

In operation 1609, the electronic device (e.g., the power check and module 530) may store the converted second digital signal.

In operation 1611, the electronic device (e.g., the communication module 540) may output the stored second digital signal. The electronic device (e.g., the communication module 540) may output the second digital signal in I2C communication upon the request of the processor 430. That is, the electronic device (e.g., the communication module 540) may convert the second digital signal into serial data and may output the converted result.

In operation 1613, the electronic device (e.g., the processor 430) may analyze the second digital signal to determine whether the received power is rated power. When the second digital signal is out of the range of the values of the rated power, the electronic device (e.g., the processor 430) may transmit corresponding feedback in operation 1615. In operation 1617, the electronic device (e.g., the power supply module 410) may adjust the power supplied to the electronic device (e.g., the image sensor 700) according to the received feedback.

According to various embodiments, a method of operating the image sensor including the pixel array, the ADC of the first group, and the ADC of the second group, which is adjacent to the first group, may include receiving power from the outside of the image sensor, converting an amount of light acquired through the pixel array into a first digital signal using the first group, and converting the power into a second digital signal using the second group.

According to various embodiments, the method of operating the image sensor may further include storing the second digital signal, outputting the stored second digital signal by the processor, and analyzing whether the power is a level of rated power on the basis of the second digital signal.

According to various embodiments, the storing of the second digital signal may further include adjusting the power to an available input range of the ADC of the second group.

According to various embodiments, the method of operating the image sensor may further include transmitting feedback so that the processor adjusts the power, when the power is not the level of the rated power.

According to various embodiments, the outputting of the stored second digital signal may include outputting the stored second digital signal in an I2C communication method.

According to various embodiments, the method of operating the image sensor may further include controlling the power using the second group.

According to various embodiments, the image sensor may further include a power control module, wherein the power control module may control the power using the second group.

According to various embodiments, the second group may transmit the second digital signal to the processor so as to adjust the power when the second digital signal is out of a designated range in the power control module located outside the image sensor.

According to various embodiments, the second group may be driven with the same control signal as the control signal applied to the first group.

According to various embodiments, the method of operating the image sensor may include outputting an analog signal, and measuring the analog signal.

According to various embodiments, the method of operating the image sensor may include controlling the power using the analog signal.

According to various embodiments, the method of operating the image sensor may include storing the analog signal and outputting the stored analog signal by the processor.

According to various embodiments, when the analog signal is out of a designated range, the method of operating the image sensor may include transmitting the analog signal so as to adjust the power.

A computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

According to various embodiments, in the image sensor including the pixel array, the ADC of the first group, and the ADC of the second group, which is adjacent to the first group, the recording medium may include a program for executing operations of receiving power from the outside of the image sensor, converting an amount of light acquired through the pixel array into a first digital signal using the first group, and converting the power into a second digital signal using the second group.

According to various embodiments, the recording medium may include the image sensor 440 including the pixel array 441 having a plurality of pixels, the ADC 443 of the first group for converting an amount of light acquired through the pixel array 441 into a first digital signal, and the ADC 446 of the second group, which is adjacent to the first group 443, for converting power supplied to the image sensor 440 into a second digital signal.

According to various embodiments, the recording medium may include the power supply module 410 and the image sensor 700, wherein the image sensor 700 may include the pixel array 710 having a plurality of pixels, the ADC 730 of the first group for converting an amount of light acquired through the pixel array 710 into a first digital signal, and the ADC 520 of the second group, which is adjacent to the first group 730, for converting power supplied from the power supply module 410 to the image sensor 700 into a second digital signal.

According to various embodiments, the recording medium may include the image sensor 700, the power supply module 410 for supplying power to the image sensor 700, and the power control module 422 provided inside the image sensor 700, wherein the power control module 422 may include a program for measuring power and configuring to transmitting feedback to the power supply module 410 when the power is out of a designated range.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. An electronic device comprising:
a power supply module; and
an image sensor, wherein the image sensor includes:
  a pixel array configured to include a plurality of pixels,
  an analog-to-digital converter (ADC) of a first group configured to convert an amount of light acquired through the pixel array into a first digital signal, and
  an ADC of a second group configured to be adjacent to the first group and to convert power supplied from the power supply module to the image sensor into a second digital signal, and
  a level shifter configured to receive the power supplied from the power supply module and adjust a level of the power to an available input range of the ADC of the second group.

2. The electronic device as claimed in claim 1, wherein the image sensor further includes a power control module, and
the power control module includes:
  a power check and memory configured to store the second digital signal, and
  a communication module configured to output the second digital signal.

3. The electronic device as claimed in claim 2, wherein the image sensor includes a plurality of devices using different types of power as operating power, and the ADC of the second group is one of a plurality of ADCs of the second group.

4. The electronic device as claimed in claim 3, wherein the plurality of devices includes a first device configured to receive first power and a second device configured to receive second power, and
the ADC of the second group includes a first ADC of the second group configured to convert the first power into a digital signal, and a second ADC of the second group configured to convert the second power into a digital signal.

5. The electronic device as claimed in claim 4, wherein the level shifter is configured to adjust the first power to an available input range of the first ADC of the second group and to adjust the second power to an available input range of the second ADC of the second group.

6. The electronic device as claimed in claim 2, wherein the communication module includes an inter-integrated circuit (I2C) communication module, the I2C communication module configured to be accessed by a processor operatively connected to the image sensor and to transmit the second digital signal to the processor.

7. The electronic device as claimed in claim 1, wherein the ADC of the second group is configured to be driven by the same control signal as a control signal applied to the ADC of the first group.

8. The electronic device as claimed in claim 1, wherein the second group includes the same number of ADCs as a number of power sources generated in the power supply module.

9. A method of operating an image sensor which includes a pixel array, an analog-to-digital converter (ADC) of a first group, an ADC of a second group which is adjacent to the first group, and a level shifter functionally connected to the ADC of the second group, the method comprising:
receiving power from the outside of the image sensor;
converting an amount of light acquired through the pixel array into a first digital signal, using the ADC of the first group;
receiving the power and adjusting the power to an available input range of the ADC of the second group, using the level shifter; and
converting the power into a second digital signal, using the ADC of the second group.

10. The method as claimed in claim 9, further comprising:
storing the second digital signal;
outputting the second digital signal by a processor; and
analyzing whether the power is a rated power level based on the second digital signal.

11. The method as claimed in claim 10, further comprising transmitting feedback so that the processor adjusts the power, when the power is out of a level of the rated power level.

12. The method as claimed in claim 10, wherein the outputting of the second digital signal comprises outputting the second digital signal in an inter-integrated circuit (I2C) communication method.

13. The method as claimed in claim 9, further comprising:
controlling the power using the ADC of the second group.

14. An image sensor comprising:
a pixel array configured to include a plurality of pixels;
an analog-to-digital converter (ADC) of a first group configured to convert an amount of light obtained through the pixel array into a first digital signal;
an ADC of a second group configured to be adjacent to the first group, and to convert power supplied to the image sensor into a second digital signal; and
a level shifter configured to receive the power supplied to the image sensor and adjust a level of the power to an available input range of the ADC of the second group.

15. The image sensor as claimed in claim 14, further comprising:
a power control module configured to control the power using the ADC of the second group.

16. The image sensor as claimed in claim 14, further comprising:
a communication module configured to output the first digital signal to an outside of the image sensor.

17. The image sensor as claimed in claim 16, further comprising:
a power control module configured to control the power using the second group.

18. The image sensor as claimed in claim 14, wherein when the second digital signal is out of a designated range, the second group is configured to transmit the second digital signal to a processor operatively connected to the image sensor so that a power control module located outside the image sensor adjusts the power.

* * * * *